United States Patent
Suzuki

(10) Patent No.: US 12,444,008 B2
(45) Date of Patent: Oct. 14, 2025

(54) INFORMATION PROCESSING APPARATUS, INFORMATION PROCESSING SYSTEM, INFORMATION PROCESSING METHOD, AND PROGRAM FOR TRANSFERRING OWNERSHIP OF A VIRTUAL ITEM

(71) Applicant: SONY GROUP CORPORATION, Tokyo (JP)

(72) Inventor: Noriyuki Suzuki, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 503 days.

(21) Appl. No.: 17/641,025

(22) PCT Filed: Aug. 27, 2020

(86) PCT No.: PCT/JP2020/032434
§ 371 (c)(1),
(2) Date: Mar. 7, 2022

(87) PCT Pub. No.: WO2021/079615
PCT Pub. Date: Apr. 29, 2021

(65) Prior Publication Data
US 2022/0327646 A1  Oct. 13, 2022

(30) Foreign Application Priority Data
Oct. 21, 2019  (JP) .................................. 2019-191710

(51) Int. Cl.
*G06Q 50/18* (2012.01)
*G06F 3/01* (2006.01)
(Continued)

(52) U.S. Cl.
CPC ........... *G06Q 50/184* (2013.01); *G06F 3/011* (2013.01); *G06Q 30/0185* (2013.01);
(Continued)

(58) Field of Classification Search
CPC .... G06T 19/006; G06T 11/00; G06F 2111/18; G06F 3/011; G06V 20/20;
(Continued)

(56) References Cited

U.S. PATENT DOCUMENTS 8,287,383 B1 * 10/2012 Etter ................... A63F 13/5378
463/42
8,424,075 B1 * 4/2013 Walsh ................. H04L 63/0263
726/14
(Continued)

FOREIGN PATENT DOCUMENTS

CN 107111340 A 8/2017
CN 108646997 A 10/2018
(Continued)

OTHER PUBLICATIONS

Zhu Miao-Liang, et al, "A Survey on Augmented Reality", Journal of Image and Graphics, vol. 9, No. 7, pp. 767-774, Jul. 25, 2004.

*Primary Examiner* — Patrick F Riegler
(74) *Attorney, Agent, or Firm* — Paratus Law Group, PLLC

(57) ABSTRACT

To provide an apparatus and a method that unfailingly perform virtual item ownership transfer processing. A data processing unit that executes display control of an AR image in which a real object and virtual content are superimposed and displayed is provided. The data processing unit executes display control of a virtual item whose ownership is registered and a virtual item trade box for transferring the ownership of the virtual item, and moreover, in a case where delivery of the virtual item is executed in the virtual item trade box, transfers the ownership of the virtual item. When the virtual item providing uses opens the hand in a state where the user's hand is in the virtual item trade box, the virtual item is moved to the hand side of the virtual item
(Continued)

receiving user, and the ownership transfer registration processing or the like is performed.

20 Claims, 25 Drawing Sheets

(51) Int. Cl.
  *G06Q 30/018* (2023.01)
  *G06Q 30/0601* (2023.01)
  *G06T 11/00* (2006.01)
  *G06T 19/00* (2011.01)
(52) U.S. Cl.
  CPC .......... *G06Q 30/0643* (2013.01); *G06T 11/00* (2013.01); *G06T 19/006* (2013.01); *G06Q 2220/10* (2013.01); *H04M 2203/359* (2013.01)
(58) Field of Classification Search
  CPC ....... H04M 2203/359; A63F 2300/575; G06Q 50/184; G06Q 30/0185; G06Q 30/0643; G06Q 2220/10
  See application file for complete search history.

(56) References Cited

U.S. PATENT DOCUMENTS

| | | | | |
|---|---|---|---|---|
| 9,293,118 | B2* | 3/2016 | Matsui | G09G 5/377 |
| 9,524,587 | B2* | 12/2016 | Anderson | G06T 19/006 |
| 10,765,948 | B2* | 9/2020 | Eatedali | A63F 13/35 |
| 11,218,838 | B2* | 1/2022 | Al Majid | G06F 3/04845 |
| 11,704,652 | B2* | 7/2023 | Ene | G07G 1/0063 |
| | | | | 705/44 |
| 2009/0265636 | A1* | 10/2009 | Ruiz-Velasco | G06Q 30/06 |
| | | | | 715/738 |
| 2009/0307021 | A1* | 12/2009 | Hamilton, II | G06Q 10/087 |
| | | | | 705/28 |
| 2009/0318234 | A1* | 12/2009 | Christensen | A63F 13/10 |
| | | | | 463/42 |
| 2011/0265041 | A1* | 10/2011 | Ganetakos | A63F 13/533 |
| | | | | 715/834 |
| 2013/0042296 | A1* | 2/2013 | Hastings | G06Q 50/184 |
| | | | | 726/1 |
| 2014/0129393 | A1 | 5/2014 | Soon-Shiong | |
| 2016/0378302 | A1* | 12/2016 | Gilger | G06F 3/0482 |
| | | | | 715/736 |
| 2017/0123750 | A1 | 5/2017 | Todasco | |
| 2018/0089898 | A1* | 3/2018 | Huddy | H04W 4/029 |
| 2018/0108080 | A1* | 4/2018 | Kuoh | G07G 1/0063 |
| 2018/0239144 | A1* | 8/2018 | Woods | A63F 13/213 |
| 2018/0300897 | A1* | 10/2018 | Woods | G06F 3/0481 |
| 2018/0342106 | A1* | 11/2018 | Rosado | G06Q 10/109 |
| 2019/0122045 | A1* | 4/2019 | Ravi | H04L 67/306 |
| 2019/0124080 | A1* | 4/2019 | Caluwaert | G06F 16/9566 |
| 2019/0311341 | A1* | 10/2019 | Rice | G06F 3/011 |
| 2020/0004401 | A1* | 1/2020 | Hwang | G06F 3/04815 |
| 2020/0401576 | A1* | 12/2020 | Yerli | G06F 9/46 |
| 2021/0065460 | A1* | 3/2021 | Lee | G06F 3/011 |
| 2021/0081092 | A1* | 3/2021 | Ikeda | G06F 3/011 |
| 2021/0387098 | A1* | 12/2021 | Jeffery, III | A63F 13/79 |
| 2023/0162169 | A1* | 5/2023 | Ene | G06Q 30/0643 |
| | | | | 705/51 |
| 2024/0428453 | A1* | 12/2024 | Woods | G06F 3/012 |

FOREIGN PATENT DOCUMENTS

| | | |
|---|---|---|
| JP | 2002-112286 A | 4/2002 |
| JP | 2003-242527 A | 8/2003 |
| JP | 2016-033800 A | 3/2016 |
| JP | 2018-153354 A | 10/2018 |
| WO | WO 2018/008226 A1 | 1/2018 |
| WO | WO 2018/067508 A1 | 4/2018 |
| WO | WO-2019100936 A1 | 5/2019 |

* cited by examiner

FIG. 6

(1) USER LIST

| (a) USER ID | (b) USER NAME | (c) USER FACE IMAGE |
|---|---|---|
| 001 | Alice | IMAGE xx |
| 002 | Bob | IMAGE yy |
| 003 | Carol | IMAGE zz |
| ... | ... | |

(2-1) CREDIT USER LIST

| (a) USER ID | (b) CREDIT USER ID |
|---|---|
| 001 | 002 (Bob) |
| 003 | 001 (Alice), 004 ·· |
| ... | |

(2-2) REJECTED USER LIST

| (a) USER ID | (b) REJECTED USER ID |
|---|---|
| 001 | 003 (Carol) |
| ... | |

(A) EXAMPLE OF USER CREDIT AND REJECTION RELATIONSHIP

EXAMPLE OF USER-OWNED ITEM LIST UPDATE PROCESSING IN CASE WHERE VIRTUAL ITEM IS TRANSFERRED FROM USER 001 TO USER 002

(3-1) USER-OWNED ITEM LIST (BEFORE UPDATE)

| (a) USER ID | (b) OWNED ITEM NAME | (b) NUMBER OF OWNED ITEMS |
|---|---|---|
| 001 | STAR | 3 |
| 001 | COIN | 2 |
| 001 | SWORD | 1 |
| 002 | STAR | 1 |
| 002 | COIN | 2 |
| 003 | SWORD | 1 |
| ... | ... | ... |

(3-2) USER-OWNED ITEM LIST (AFTER UPDATE)

| (a) USER ID | (b) OWNED ITEM NAME | (b) NUMBER OF OWNED ITEMS |
|---|---|---|
| 001 | STAR | 2 |
| 001 | COIN | 2 |
| 001 | SWORD | 1 |
| 002 | STAR | 2 |
| 002 | COIN | 2 |
| 003 | SWORD | 1 |
| ... | ... | ... |

INFORMATION PROCESSING APPARATUS, INFORMATION PROCESSING SYSTEM, INFORMATION PROCESSING METHOD, AND PROGRAM FOR TRANSFERRING OWNERSHIP OF A VIRTUAL ITEM

CROSS REFERENCE TO PRIOR APPLICATION

This application is a National Stage Patent Application of PCT International Patent Application No. PCT/JP2020/032434 (filed on Aug. 27, 2020) under 35 U.S.C. § 371, which claims priority to Japanese Patent Application No. 2019-191710 (filed on Oct. 21, 2019), which are all hereby incorporated by reference in their entirety.

TECHNICAL FIELD

The present disclosure relates to an information processing apparatus, an information processing system, an information processing method, and a program. More specifically, it relates to an information processing apparatus, an information processing system, an information processing method, and a program that perform processing of transferring the ownership of virtual content between users using an augmented reality (PR) image that is displayed by superimposing virtual content on a real object that can be observed in reality.

BACKGROUND ART

A real object that can be observed in real space or an image that is displayed by super imposing a virtual object on a real object image is called an augmented reality (AR) image.

As an example of content display by an AR image, for example, processing of displaying an image of a person in real space and displaying virtual content is performed.

Specifically, for example, in a case where battle-type game content in which a plurality of real people forms teams fight with each other is displayed as an AR image, there is a case where processing of displaying various weapons such as swords and pistols as virtual items (virtual content) and providing a weapon owned by a user (a real person) to another user is performed.

For example, when a virtual item such as a "sword" or the like is provided from user A to user B, the ownership of the virtual item "sword" is transferred from user A to user B.

However, in a case where user A who owns the virtual item "sword" wants to pass the "sword" to user B who appears on the AR image, user A performs processing of presenting the "sword" to user B. However, there is a problem that user B who is looking at the AR image cannot determine whether the processing of presenting the "sword" by user A indicates that user A wants to provide the "sword." to user B or user A wants to fight user B using the "sword".

Furthermore, there is also a problem that even in a case where user A hands the "sword" to user B, it is unclear whether user A has temporarily lent the "sword" to user B or has fully transferred the ownership.

Furthermore, in a case where not only user B to which the user A wants to pass the virtual item, but also other users C, D, E, and the like are displayed in real space displayed as an AR image, there is also a problem that it is difficult to unfailingly pass the virtual item to user B.

Note that as a conventional technique that discloses processing relating to an association between a virtual item and a user, for example, Patent Document 1 (Japanese Patent Application Lad-Open No. 2018-153354) is available.

Patent Document 1 discloses processing of associating and registering a money object, which is a virtual item, with an owning user.

Specifically, it is processing such as transfer of the ownership of a money object by processing of handing the money object between two users.

However, this document has a configuration in which the ownership of the money object is acquired by the user by the processing of holding the money object in hand by the user, and there is a problem described below. For example, when the owning user of the money object drops the money object and the money, object is picked up by another user, a problem that the ownership is transferred occurs regardless of the intention of the owning user of the money object.

Furthermore, Patent Document. 2 (Japanese Patent Application Laid-Open No. 2003-242527) discloses processing of specifying a target user to which an owning user of a virtual object wants to pass the virtual object.

This document has a configuration in which in a case where the processing in which the owning user of the virtual object holds the virtual object in the hand and throws the virtual object to hand it to the target user is performed, a user who is in the line-of-sight direction at the moment when the virtual object owning user performs a throwing operation that performs an operation of throwing the virtual object, specifically, at the moment when the movement speed of the hand becomes a certain level or less is determined as the target user to which the owning user passes the virtual object.

With this configuration, it is necessary to analyze the hand throw operation and analyze the line of sight with high accuracy, and there is a problem that the cost is high because the configuration for performing such analysis processing becomes indispensable.

Furthermore, this disclosed configuration specifically discloses a configuration in which a ball in a case of playing catch is regarded as a virtual object and a throwing target to which this ball is thrown is specified, but does not disclose the concept of transfer of the ownership of the virtual object.

CITATION LIST

Patent Document

Patent Document 1: Japanese Patent Application Laid-Open No. 2018-153354
Patent Document 2: Japanese Patent Application Laid-Open No. 2003-242527

SUMMARY OF THE INVENTION

Problems to be Solved by the Invention

The present disclosure provides an information processing apparatus, an information processing system, an information processing method, and a program that enable execution of processing of transferring the ownership of a virtual item (virtual content) displayed in an AR image while it is unfailingly recognized between users.

Solutions to Problems

A first aspect of the present disclosure is
an information processing apparatus including:

a data processing unit that executes display control of an augmented reality (AR) image in which a real object and virtual content are superimposed and displayed, in which the data processing unit executes display control of a virtual item that is virtual content for which an ownership is registered, and a virtual item trade box that is a limited region for performing ownership transfer processing of the virtual item, and performs processing of transferring the ownership of the virtual item in a case where processing of delivery of the virtual item is executed in the virtual item trade box.

Moreover, a second aspect of the present disclosure is an information processing system including:

a user terminal that has a display unit that displays an augmented reality (AR) image in which a real object and virtual content are superimposed and displayed; and a server that executes communication with the user terminal and executes display control of the AR image displayed on the display unit of the user terminal, in which as virtual content display control processing with respect to the display unit of the user terminal, the server executes display control of a virtual item that is virtual content for which an ownership is registered, and a virtual item trade box that is a limited region for performing ownership transfer processing of the virtual item, and performs processing of transferring the ownership of the virtual item in a case where processing of delivery of the virtual item is executed in the virtual item trade box.

Moreover, a third aspect of the present disclosure is an information processing method executed in an information processing apparatus including:

a data processing unit that executes display control of an augmented reality (AR) image in which a real object and virtual content are superimposed and displayed, the information processing method including:

by the data processing unit, executing display control of a virtual item that is virtual content for which an ownership is registered, and a virtual item trade box that is a limited region for performing ownership transfer processing of the virtual item; and performing processing of transferring the ownership of the virtual item in a case where processing of delivery of the virtual item is executed in the virtual item trade box.

Moreover, a fourth aspect of the present disclosure is an information processing method executed in an information processing system including:

a user terminal that has a display unit that displays an augmented reality (AR) image in which a real object and virtual content are superimposed and displayed; and a server that executes communication with the user terminal and executes display control of the AR image displayed on the display unit of the user terminal, the information processing method including:

by the server, as virtual content display control processing with respect to the display unit of the user terminal, executing display control of a virtual item that is virtual content for which an ownership is registered, and a virtual item trade box that is a limited region for performing ownership transfer processing of the virtual item; and performing processing of transferring the ownership of the virtual item in a case where processing of delivery of the virtual item is executed in the virtual item trade box.

Moreover, a fifth aspect of the present disclosure is a program causing an information processing apparatus to execute information processing, the information processing apparatus including:

a data processing unit that executes display control of as augmented reality (AR) image in which a real object and virtual content are superimposed and displayed, the program causing the data processing unit to:

execute display control of a virtual item that is virtual content for which an ownership is registered, and a virtual item trade box that is a limited region for performing ownership transfer processing of the virtual item; and perform processing of transferring the ownership of the virtual item in a case where processing of delivery of the virtual item is executed in the virtual item trade box.

Note that the program of the present disclosure is, for example, a program that can be provided by a storage medium or a communication medium that is provided in a computer-readable format to an information processing apparatus or a computer system that can execute various program codes. By providing such a program in a computer-readable format, processing according to the program can be realized on the information processing apparatus or the computer system.

Still other objects, features, and advantages of the present disclosure will be apparent from the following examples of the present disclosure and more detailed description based on the accompanying drawings. Note that, in the present specification, the system is a logical set configuration of a plurality of apparatuses, and is not limited to those in which the apparatuses of each configuration are in the same housing.

With the configuration of one example of the present disclosure, an apparatus and a method that unfailingly perform the virtual item ownership transfer processing are realized.

Specifically, for example, a data processing unit that executes display control of an AR image in which a real object and virtual content are superimposed and displayed is provided. The data processing unit executes display control of a virtual item whose ownership is registered and a virtual item trade box for transferring the ownership of the virtual item, and moreover, in a case where delivery of the virtual item is executed in the virtual item trade box, transfers the ownership of the virtual item. When the virtual item providing user opens the hand in a state where the user's hand is in the virtual item trade box, the virtual item is moved to the hand side of the virtual item receiving user, and the ownership transfer registration processing or the like is performed.

With this configuration, an apparatus and a method that unfailingly perform the virtual item ownership transfer processing are realized.

Note that the effects described in the present specification are merely illustrative and are not limitative, and additional effects may be provided.

BRIEF DESCRIPTION OF DRAWINGS

FIG. 6 is a diagram explaining an example of a user list stored in a storage unit of the information processing apparatus of the present disclosure.

MODE FOR CARRYING OUT THE INVENTION

Figure 1:
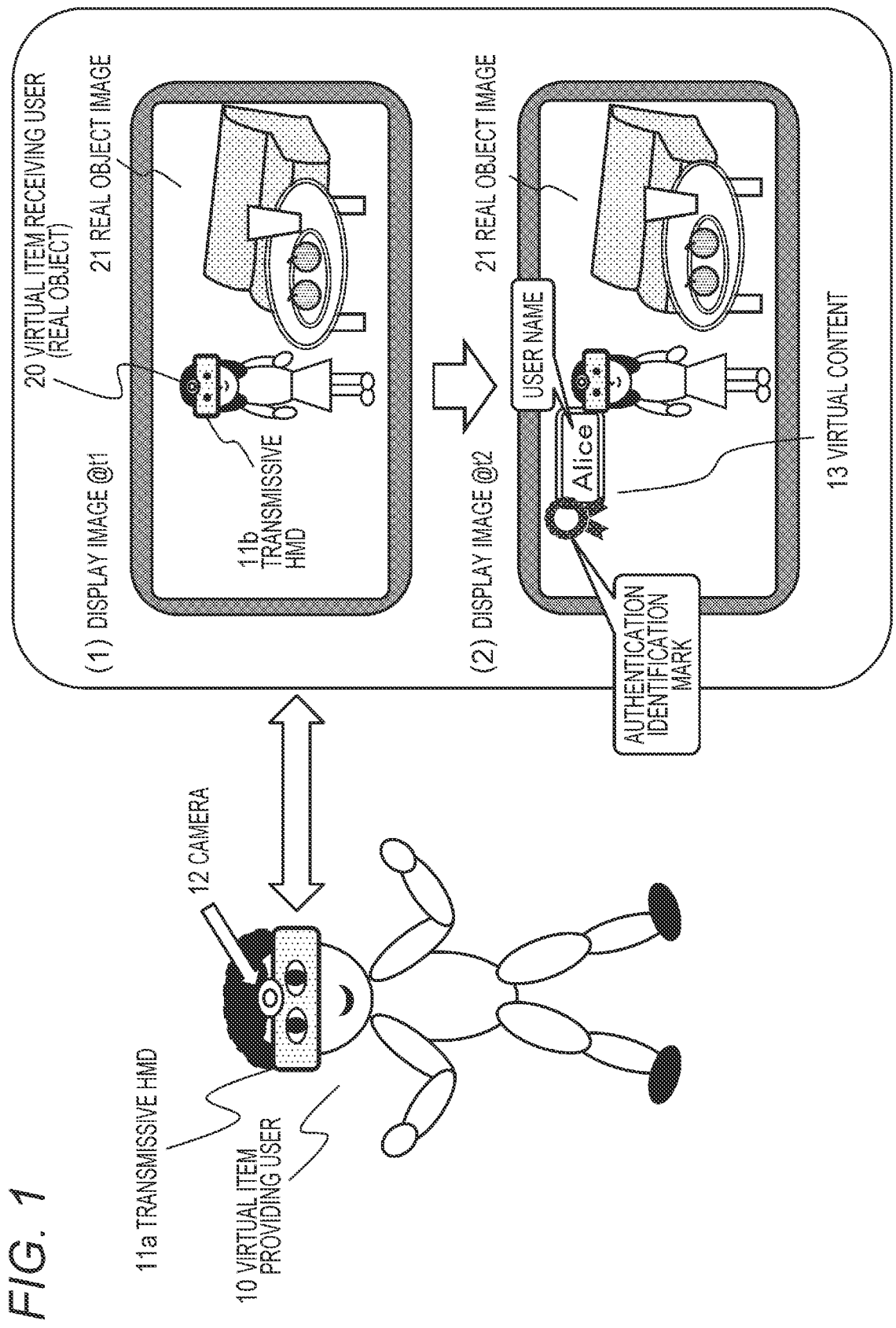
FIG. 1 is a diagram explaining processing executed by an information processing apparatus of the present disclosure.

Hereinafter, the details of the information processing apparatus, the information processing system, the information processing method, and the program of the present disclosure will be described with reference to the drawings. Note that the description will be given according to the following items.

1. Regarding processing executed by the information processing apparatus of the present disclosure 2. Regarding processing and list executed and held by the information processing apparatus of the present disclosure 3. Regarding configuration example of the information processing apparatus that performs virtual content display control and virtual item ownership transfer control 4. Regarding configuration example of the information processing apparatus 5. Regarding processing sequence executed by the information processing apparatus of the present disclosure 6. Regarding specific example of processing of transfer of ownership of virtual item 7. Regarding hardware configuration example of the information processing apparatus 8. Summary of configuration of the present disclosure 1. Regarding Processing Executed by the Information Processing Apparatus of the Present Disclosure First, the processing executed by the information processing apparatus of the present disclosure will be described with reference to FIG. 1 and subsequent drawings.

FIG. 1 illustrates a user wearing a transmissive head mounted display (HMD) 11a, which is an example of the information processing apparatus of the present disclosure.

The transmissive head mounted display (HMD) 11a is an AR image display device.

Note that the information processing apparatus of the present disclosure can be realized as various apparatuses such as a PC, a smartphone, and a server in addition to the head mounted display (HMD) illustrated in FIG. 1.

The information processing apparatus of the present disclosure executes control regarding transfer of the ownership of a virtual item (virtual content) displayed in an augmented reality (AR) image. Note that the virtual item described in the example below is virtual content, and virtual content the ownership of which is registered.

The virtual item transfer control processing can also be executed in a data processing unit in the head mounted display (HMD) illustrated in FIG. 1, and can also be executed in various apparatuses such as a PC, a smartphone, and a server.

Examples of using these various apparatuses will be described below.

First, referring to FIG. 1 and subsequent drawings, a series of processing executed by the information processing apparatus of the present disclosure assuming that the data processing unit in the head mounted display (HMD) illustrated in FIG. 1 performs the virtual item transfer control processing will be described.

Note that the user includes a "virtual item providing user 10" and a "virtual item receiving user 20".

The virtual item providing user 10 is a user who owns a virtual item, which is virtual content displayed on the transmissive HMD 11a, which is an AR image display device, and is a user who provides the owned virtual item to the virtual item receiving user 20.

When the virtual item providing processing is executed, the ownership of the virtual item is transferred from the virtual item providing user 10 to the virtual item receiving user 20.

This processing will be described in detail below.

The user illustrated on the left side of FIG. 1 is the virtual item providing user 10.

The virtual item providing user 10 wears the transmissive HMD 11a so as to cover the eyes.

The transmissive HMD 11a has a transmissive display unit (display). The transmissive display unit (display) is attached so that it is located in front of the user.

The virtual item providing user 10 can observe an external real object as it is through the transmissive display unit (display) of the transmissive HMD 11a.

Moreover, a virtual content image of a virtual object, for example, character or various item images, is displayed on the transmissive display unit (display).

The virtual item providing user 10 can observe an external real object and a virtual content image together via the transmissive HMD 11a to experience the feeling as if the virtual content such as a character or an item exists in the real world.

On the right side of FIG. 1, an example of an image that can be observed by the virtual item providing user 10 via the transmissive HMD 11a is illustrated.

(1) Display image @t1 is an example of an image observed by the virtual item providing user 10 in the transmissive HMD 11a at time=t1. This display image includes only an external real object image 21.

This display image includes the virtual item receiving user 20. The virtual item receiving user 20 is a real object and is a user that really exists. The virtual item receiving user 20 also wears a transmissive HMD 11b similar to that of the virtual item providing user 10.

(2) Display image @t2 is a display image at the next time=t2. The display image at time t2 is an image in which virtual content 13 is additionally displayed on the display image at time t1.

The virtual content 13 includes "user name (Alice)" of the virtual item receiving user 20 and an "authentication identification mark" indicating that the virtual item receiving user 20 is a reliable authenticated user.

The ID and position of the virtual item receiving user 20 are recognized by the ID and position set in the transmissive HMD 11b worn by the virtual item receiving user 20. Note that, in the case where the HMD is not used, a camera may be used. For example, user identification processing may be executed on the basis of the face image of the person captured by a camera 12 of the transmissive HMD 11a worn by the virtual item providing user 10 to display the name of the identified user.

Moreover, in a case where the identified user (Alice in this example) is determined to be a reliable "credit user" of the virtual item providing user 10, an "authentication identification mark" indicating that the user is a "credit user" is displayed.

The data processing unit of the information processing apparatus executes the display control of such user name and authentication identification mark. In this example, it is executed by the data processing unit of the transmissive HMD 11a worn by the virtual item providing user 10.

The details of this processing will be described below.

Next, an example of an image at and after time=t3 displayed on the transmissive HIND 11a worn by the virtual item providing user 10 will be described with reference to FIG. 2 and subsequent drawings.

Figure 2:
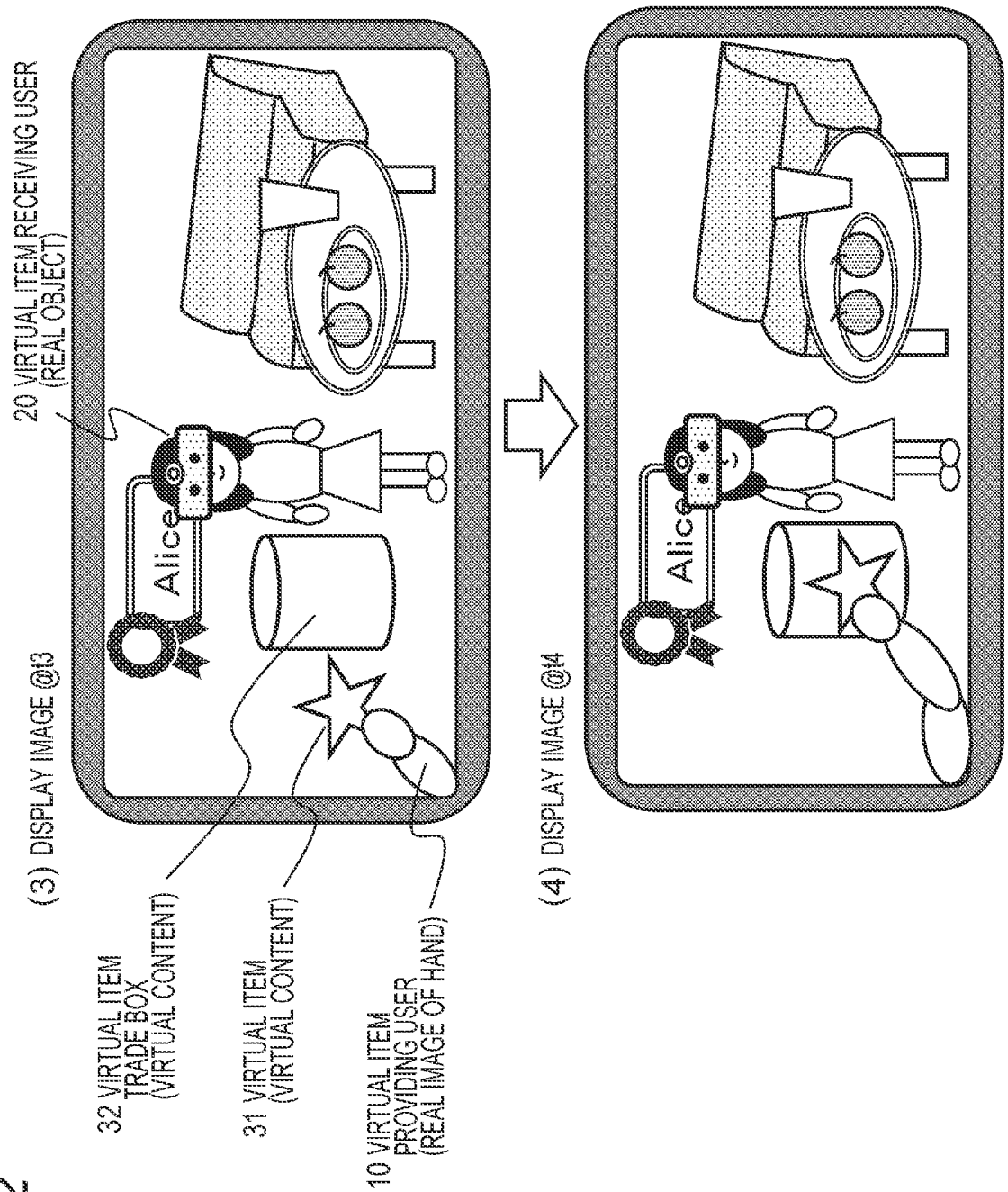
FIG. 2 is a diagram explaining processing executed by the information processing apparatus of the present disclosure.

(3) Display image @t3 of FIG. 2 is an image displayed on the transmissive HMD 11a worn by the virtual item providing user 10 at time=t3 following time t2.

In the display image at time t3, a virtual item 31, which is virtual content to be traded, is displayed.

The virtual item 31 is a virtual item for which the virtual item providing user 10 has the ownership, and the display is executed in a state where it is held in the hand of the virtual item providing user 10.

Note that the hand of the virtual item providing user 10 illustrated in display image @t3 is a real object, that is, the actual hand of the virtual item providing user 10. However, the image of the hand of the virtual item providing user 10 may be displayed as virtual content.

In the display image at this time t3, in addition to the virtual item 31, a virtual item trade box 32 is displayed as virtual content.

The virtual item trade box 32 is a box displayed as a trade execution region for performing processing of trade of the virtual item 31, that, is, processing of transfer of the ownership of the virtual item.

Note that, in the following description of the example, an example in which the virtual item trade box 32 is a columnar space region will be described, but the region of the virtual item trade box 32 can be set in various ways. For example, it may be a three-dimensional space region having a cubic shape or a spherical shape. Furthermore, it is also possible to have a flat circular region or rectangular region set on a screen.

In the example described below, the virtual item trade box 32 will be described as a columnar space region.

The virtual item trade box 32 is a box displayed in a case where predetermined display conditions are satisfied.

The conditions for displaying the virtual item trade box 32 are, for example, the conditions described below.

(a) The distance between the "credit user" for which the "authentication identification mark" is displayed and the virtual item providing user 10 is equal to or less than a predetermined threshold value distance.

For example, the virtual item trade box 32 is displayed in a case where the condition (a) described above is satisfied.

This condition determination processing and display control processing are executed in the data processing unit of the information processing apparatus. In this example, it is executed by the data processing unit of the transmissive HMD 11a worn by the virtual item providing user 10.

Note that the condition for displaying the virtual item trade box 32 is not limited to the condition (a) described above, but may be, for example, the condition (b) described below.

(b) The "credit user" for which the "authentication identification mark" is displayed is displayed within a specified region of the transmissive HMD 11a worn by the virtual item providing user 10.

For example, it is also possible to set the virtual item trade box 32 to be displayed in a case where the condition (b) described above is satisfied.

(4) Display image @t4 of FIG. 2 is an image displayed on the transmissive HMD 11a worn by the virtual item providing user 10 at time=t4 following time t3.

The display image at this time t4 indicates a state where the virtual item providing user 10 who holds the virtual item 31, which is the virtual content to be traded, reaches out and puts the virtual item 31 inside the virtual item trade box 32.

This processing is performed by the virtual item providing user 10 actually reaching out.

Note that although the virtual item providing user 10 does not have anything in reality, the hand in a state of holding the virtual item 31 is displayed as the display image.

The data processing unit of the information processing apparatus executes display control of changing the display position of the virtual item 31 in accordance with the movement of the hand of the virtual item providing user 10.

As illustrated in (4) display image @t4 of FIG. 2, the processing in which the virtual item providing user 10 reaches out and puts the virtual item 31 inside the virtual item trade box 32 becomes an indication of intention that the virtual item providing user 10 has an intention to pass the virtual item 31 to another user.

Here, the virtual item providing user 10 indicates an intention to provide the virtual item 31 to the virtual item receiving user 20, that is, to transfer the ownership.

Next, subsequent processing will be described with reference to FIG. 3.

Figure 3:
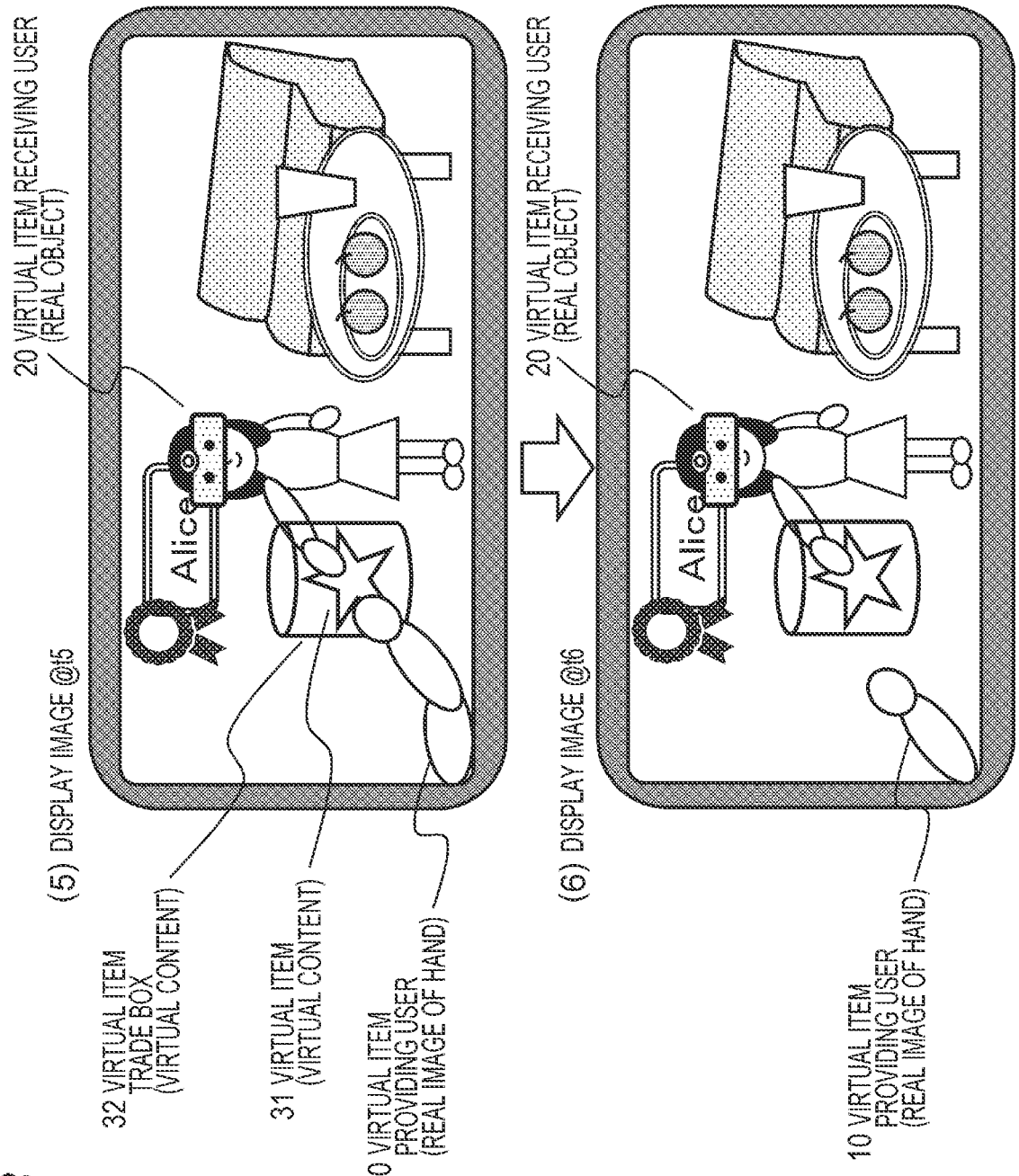
FIG. 3 is a diagram explaining processing executed by the information processing apparatus of the present disclosure.

(5) Display image @t5 of FIG. 3 is an image displayed on the transmissive HMD 11a worn by the virtual item providing user 10 at time=t5 following time t4.

The display image at this time t5 is an image illustrating the state where the virtual item receiving user 20 puts the hand inside the virtual item trade box 32 in the state where the virtual item providing user 10 puts the virtual item 31 and the hand inside the virtual item trade box 32.

The processing in which the virtual item receiving user 20 puts the hand inside the virtual item trade box 32 is processing indicating that the virtual item receiving user 20 has an intention to receive the virtual item 31.

(6) Display image @6 of FIG. 3 is an image displayed on the transmissive HMD 11a worn by the virtual item providing user 10 at time=t6 following time t5.

The display image at this time t6 is an image illustrating the state where the virtual item providing user 10 has released the virtual item 31 and pulled the hand out of the virtual item trade box 32, while the virtual item receiving user 20 holds the virtual item 31 inside the virtual item trade box 32.

By this processing, the ownership of the virtual item 31 is transferred from the virtual item providing user 10 to the virtual item receiving user 20.

The information processing apparatus stores a list of ownerships in units of each virtual item in the storage unit, and updates the registration information of this list in a case where the ownership of the virtual item is transferred.

In this example, the list update processing for changing the ownership of the virtual item 31 from the virtual item providing user 10 to the virtual item receiving user 20 is executed.

The details of this processing will also be described below.

Figure 4:
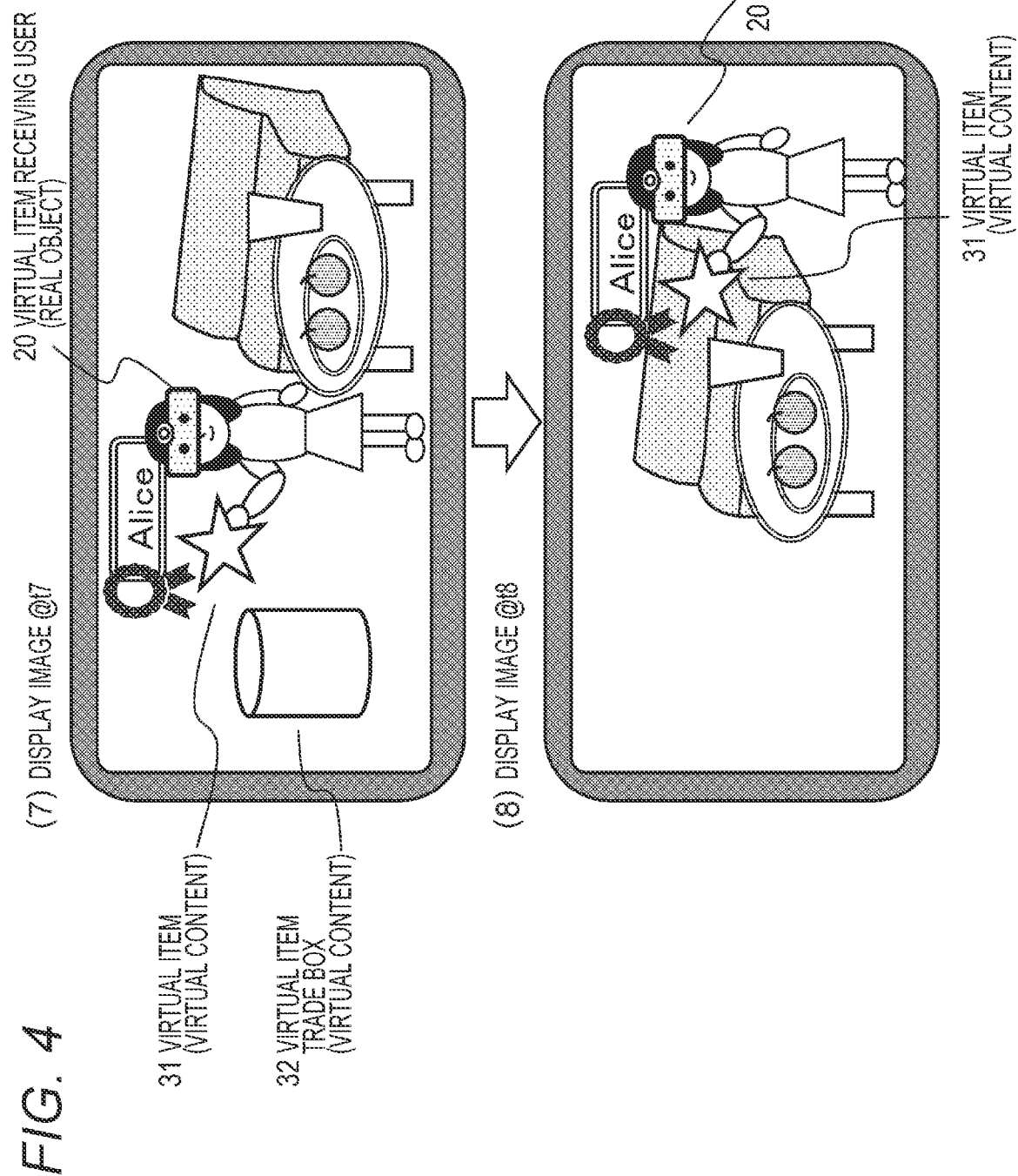
FIG. 4 is a diagram explaining processing executed by the information processing apparatus of the present disclosure.

Moreover, (7) display image @7 of FIG. 4 is an image displayed on the transmissive HMD 11a worn by the virtual item providing user 10 at time=t7 following time t6.

The display image at this time t7 illustrates a state where the virtual item receiving user 20 has pulled the hand out of the virtual item trade box 32 while holding the virtual item 31.

Moreover, (8) display image @8 of FIG. 4 is an image displayed on the transmissive HMI) 11a worn by the virtual item providing user 10 at time=t8 following time t7.

The display image at this time t8 illustrates a state where the virtual item receiving user 20 has moved while holding the virtual item 31.

Moreover, in the display image at this time t8, the display of the virtual item trade box 32 is turned off and is in a hidden state.

In a case where the predetermined conditions are satisfied, the information processing apparatus turns off the display of the virtual item trade box 32 and changes it to a hidden state.

The conditions for turning off the display of the virtual item trade box 32 are, for example, the conditions described below.

(a) The distance between the "credit user" for which the "authentication identification mark" is displayed and the virtual item providing user 10 is equal to or more than the predetermined threshold value distance.

For example, the display of the virtual item trade box 32 is turned off and hidden in a case where the condition (a) described above is satisfied.

This condition determination processing and display control processing are executed in the data processing unit of the information processing apparatus. In this example, it is executed by the data processing unit of the transmissive HMD 11a worn by the virtual item providing user 10.

Note that the condition for hiding the virtual item trade box 32 is not limited to the condition (a) described above, but may be, for example, the conditions described below.

(b) The "credit user" for which the "authentication identification mark" is displayed has moved to the outside of the specified region from the inside of the specified region of the transmissive HMD 11a worn by the virtual item providing user 10.

(c) The hand of the "credit user" for which the "authentication identification mark" is displayed has pulled out of the virtual item trade box 32, and (d) The position of the "credit user" for which the "authentication identification mark" is displayed has moved away a specified distance or more from the virtual item trade box 32.

For example, in a case where any of the conditions (b) to (d) described above is satisfied, processing that the display of the virtual item trade box 32 is turned off and changed into a hidden state may be performed.

A series of sequence of the virtual item ownership transfer processing has been described above with reference to FIGS. 1 to 4.

2. Regarding Processing and List Executed and Held by the Information Processing Apparatus of the Present Disclosure Next, with reference to FIG. 5 and subsequent drawings, the processing executed by the information processing apparatus of the present disclosure and the lists stored in the storage unit of the information processing apparatus will be described.

Figure 5:
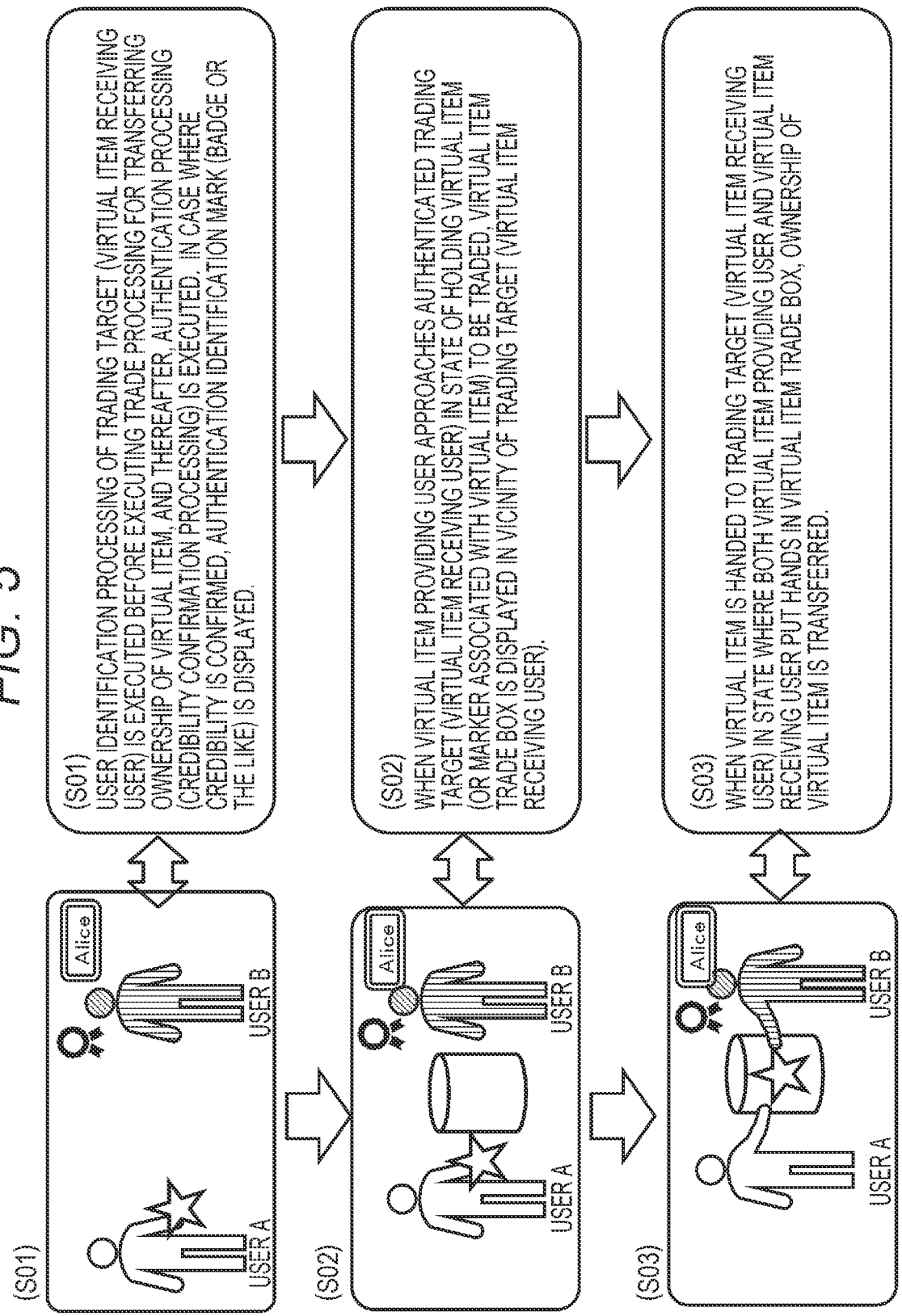
FIG. 5 is a diagram explaining processing executed by the information processing apparatus of the present disclosure.

FIG. 5 is a diagram explaining the processing executed by the information processing apparatus of the present disclosure by roughly dividing it into three processing steps, that is, the processing of steps S01 to S03.

Hereinafter, the processing of each step will be described in sequence.

(Step S01)

First, in step S01, the information processing apparatus of the present disclosure executes user identification processing of a trading target (virtual item receiving user) as processing before executing trade processing for transferring the ownership of a virtual item. Moreover, thereafter, the authentication processing (credibility confirmation processing) with respect to the trading target (virtual item receiving user) for which user identification has succeeded is executed.

Only in a case where the authentication processing (credibility confirmation processing) with respect to this trading target (virtual item receiving user) is successful and it is determined that the trading target (virtual item receiving user) is a credible user, the authentication identification mark (a badge or the like) is displayed near the trading target (virtual item receiving user).

The processing of this step S01 corresponds to the processing of shifting from (1) display image @t1 to (2) display image @t2 described above with reference to FIG. 1.

When executing the user identification processing of the trading target (virtual item receiving user), the information processing apparatus refers to the user list stored in the storage unit of the information processing apparatus.

FIG. 6 illustrates a specific example of the user list stored in the storage unit of the information processing apparatus.

As illustrated in FIG. 6, data described below are registered in association with each other in the user list.

(a) User ID
(b) User name
(c) User face image

The user who uses the system of the present disclosure executes user registration in advance. Specifically, the processing of registering the user name and the face image is performed.

In a case where a new user is detected in the display unit that the information processing apparatus controls the display, the information processing apparatus first executes the processing of identifying the user.

Note that, as described above, the ID and position of the virtual item receiving user 20 can be identified by the ID and position set in the transmissive HMD 11b worn by the virtual item receiving user 20.

Note that in the case where the HMD is not used, the processing in which a camera-captured image captured by the camera of the information processing apparatus is compared with the face image registered in the user list and a registered face image having a high degree of matching with the captured image is extracted may be performed. Moreover, the processing of displaying the user name recorded in the entry of the extracted registered face image as virtual content near the detected user is performed.

For example, the user name such as [Alice] described above with reference to FIGS. 1 to 4 is displayed.

Moreover, thereafter, the information processing apparatus executes the authentication processing (credibility confirmation processing) with respect to the trading target (virtual item receiving user) for which user identification has succeeded.

Only in a case where the authentication processing (credibility confirmation processing) with respect to this trading target (virtual item receiving user) is successful and it is determined that the trading target (virtual item receiving user) is a credible user, the authentication identification mark (a badge or the like) is displayed near the trading target (virtual item receiving user).

The authentication processing (credibility confirmation processing) with respect to the trading target (virtual item receiving user) for which user identification has succeeded is executed with reference to an inter-user credit information list stored in the storage unit of the information processing apparatus.

Figure 7:
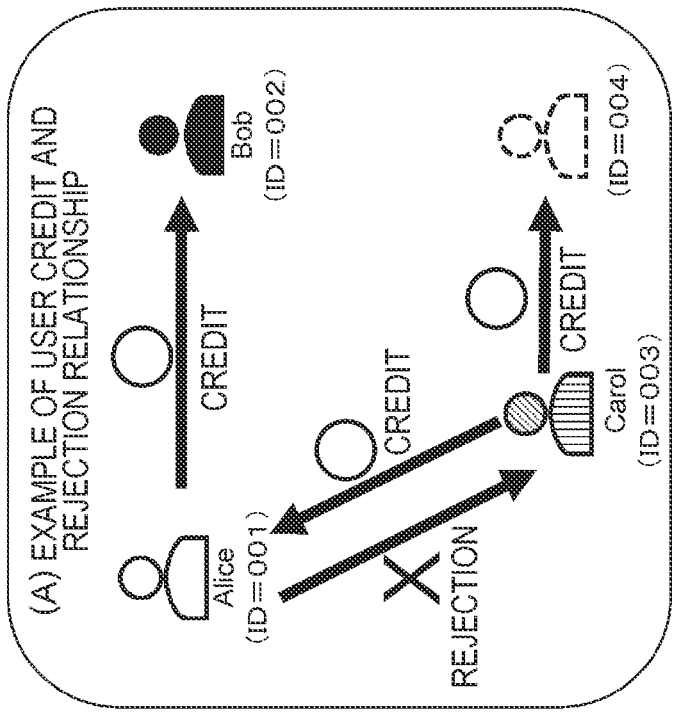
FIG. 7 is a diagram explaining an example of an inter-user credit information list stored in the storage unit of the information processing apparatus of the present disclosure.

FIG. 7 illustrates a specific example of the inter-user credit information list stored in the storage unit of the information processing apparatus.

As illustrated in FIG. 7, the inter-user credit information list includes two lists described below.

(2-1) Credit user list
(2-2) Rejected user list (2-1) The credit user list is a list in which a user ((b) credit user) that a user ((a) user ID) gives credit is registered.

As illustrated in the drawing, the correspondence data between (a) user ID and (b) credit user ID is registered.

The user ID of the user that the user having the user ID recorded in the item "(a) user ID" in the credit user list gives credit is registered in the item "(b) credit user ID".

This list is generated and updated by, for example, each user notifying the information processing apparatus of a "credit user" that the user gives credit.

The data processing unit of the information processing apparatus records the user ID of the user who made the notification in the item "(a) user ID", and records the user ID of the "credit user" included in the notification in the item "(b) credit user".

On the other hand, (2-2) rejected user list is a list in which a user ((b) rejected user) that a user ((a) user ID) does not give credit is registered.

As illustrated in the drawing, the correspondence data between (a) user ID and (b) rejected user ID is registered.

The user ID of the user that the user having the user ID recorded in the item "(a) user ID" in the rejected user list does not give credit is registered in the item "(b) rejected user ID".

This list is also generated and updated by, for example, each user notifying the information processing apparatus of a "rejected user" that the user does not give credit.

The data processing unit of the information processing apparatus records the user ID of the user who made the notification in the item "(a) user ID", and records the user ID of the "rejected user" included in the notification in the item "(b) rejected user".

FIG. 7 illustrates
(2-4) credit user list
(2-2) rejected user list.

The recorded data in these lists corresponds to a list in which data according to the credit and rejection relationship of users (user ID=001 to 004 illustrated in the lower right of FIG. 7 is registered.

In this way, the storage unit of the information processing apparatus records the inter-user credit information list including the two lists: the credit user list in which credit users that each user gives credit are registered and the rejected user list is which rejected users that each user does not give credit are registered.

In step S01 illustrated in FIG. 5, the information processing apparatus executes the processing described below.

The information processing apparatus refers to the inter-user credit information list and executes the authentication processing (credibility confirmation processing) with respect to the trading target (virtual item receiving user).

In a case where the user ID of the trading target (virtual item receiving user) is registered as the "credit user" of the virtual item providing user in the credit user list illustrated in (2-1) of FIG. 7, it is determined that the trading target (virtual item receiving user) is a "credit user". In this case, the authentication identification mark (a badge or the like) is displayed near the trading target (virtual item receiving user).

On the other hand, in a case where the user ID of the trading target (virtual item receiving user) is not registered as the "credit user" of the virtual item providing user in the credit user list illustrated in (2-1) of FIG. 7, it is determined that the trading target (virtual item receiving user) is not a "credit user". In this case, the processing that the authentication identification mark (a badge or the like) is displayed near the trading target (virtual item receiving user) is not executed.

In this case, the virtual item trade processing of step S02 and a subsequent step in FIG. 5 is not executed.

Only in a case where the trading target (virtual item receiving user) is determined to be a "credit user" and the processing of displaying the authentication identification mark (a badge or the like) near the trading target (virtual item receiving user) is executed, the processing of step S02 and a subsequent step illustrated in FIG. 5 is executed.

(Step S02)

The information processing apparatus executes the processing described below in step S02.

When the virtual item providing user approaches an authenticated trading target (virtual item receiving user) in a state of holding the virtual item (or marker associated with the virtual item) to be traded in the hand, the virtual item trade box is displayed in the vicinity of the trading target (virtual item receiving user).

The processing of this step S02 corresponds to the processing of shifting from (2) display image @t2 to (3) display image @t3 described above with reference to FIGS. 1 and 2.

The information processing apparatus executes display control of the virtual item trade box.

As described above, the display conditions of the virtual item trade box are, for example, the conditions described below.

(a) The distance between the "credit user" for which the "authentication identification mark" is displayed and the virtual item providing user is equal to or less than the predetermined threshold value distance.

The information processing apparatus executes the processing of displaying the virtual item trade box, for example, in a case where it is determined that the condition (a) described above is satisfied.

Note that, as described above, the display condition of the virtual item trade box is not limited to the condition (a) described above, but may be, for example, the condition (b) described below.

(b) The "credit user" for which the "authentication identification mark" is displayed is displayed within a specified region of the transmissive AR image display device worn by the virtual item providing user.

For example, it is also possible to set the virtual item trade box to be displayed in a case where the condition (b) described above is satisfied.

Note that in a case where the virtual item to be traded is small enough to be held in the hand, the information processing apparatus displays the virtual item in a state of being held in the hand as it is. However, in a case where the virtual item to be traded is large rather than small enough to be held in hand, or in a case where it is an intangible object, such as position, status, license, credentials, or the like, the virtual item itself may be configured to be not displayed, but the marker associated with the virtual item may be configured to be displayed.

A specific example will be described with reference to FIG. 8.

Figure 8:
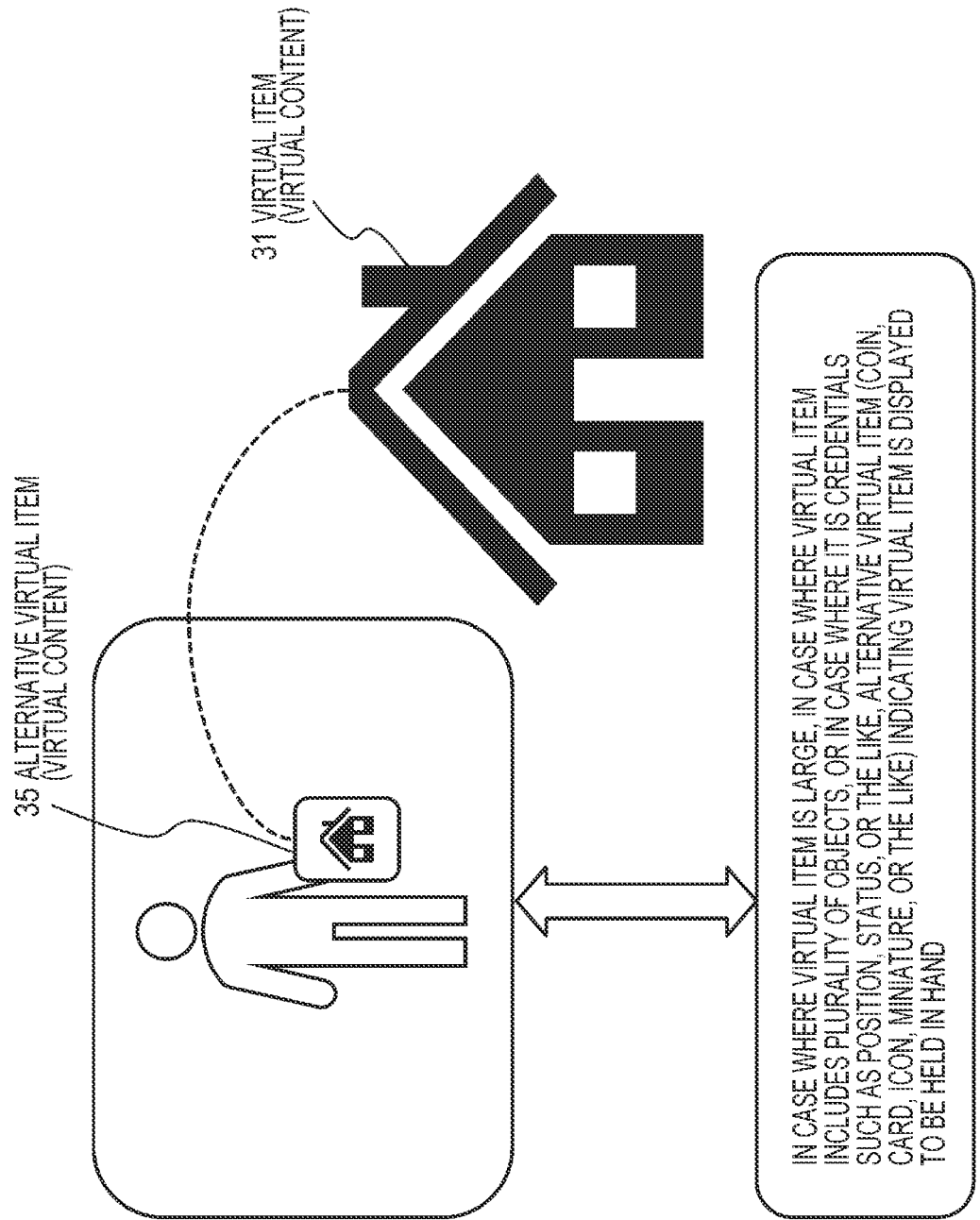
FIG. 8 is a diagram explaining an example of a virtual item.

The example illustrated in FIG. 8 is an example in a case where the virtual item 31 to be traded is a house. The house itself is large and cannot be held in the hand of the user. Note that this house is virtual content.

In such a case, an alternative virtual item 35 associated with the house, which is a virtual item, i.e., the alternative virtual, item 35 such as a coin, a card, an icon, or a miniature is displayed to be held in the hand.

(Step S03)

Returning to FIG. 5, the processing of the final step 03 will be described.

After the display processing of the virtual trade box is performed in step S02, the information processing apparatus executes the processing described below in step S03.

According to the detection that the processing of handing the virtual item to the trading target (virtual item receiving user) has been performed in a state where both the virtual item providing user and the virtual item receiving user put the hands in the virtual item trade box, the ownership of the virtual item is transferred.

A specific example of the processing of handing the virtual item from the virtual item providing user to the virtual item receiving user in the virtual item trade box will be described with reference to FIG. 9.

The state illustrated in FIG. 9(a) indicates the initial state in which both the virtual item providing user 10 and the virtual item receiving user 20 are putting the hands in the virtual item trade box.

This initial state is a state where the virtual item providing user 10 holds the virtual item 31 to be traded in the hand.

The virtual item receiving user 20 is in a state of opening the hand and holding nothing.

Next, the virtual item 31 is provided from the virtual item providing user 10 to the virtual item receiving user 20, so that the state illustrated in FIG. 9(b) is obtained.

The state illustrated in FIG. 9(b) is a state where the virtual item receiving user 20 holds the virtual item 31 to be traded in the hand.

The virtual item receiving user 10 is in a state of opening the hand and holding nothing.

For example, the information processing apparatus detects that the virtual item providing user 10 has shifted from the state of gripping the hand to the state of opening the hand, and performs display control to move the display position of the virtual item 31 to the position of the hand of the virtual receiving user 20.

When the virtual item receiving user 20 grips the hand in this state, the information processing apparatus then displays the virtual item 31 following the position of the hand of the virtual item receiving user 20.

The information processing apparatus executes, for example, such display control.

Note that the detection of the user's hand gripping and opening motion is executed, for example, by analyzing a camera-captured image.

However, the processing of moving the virtual item between the hands of different users in this way is limited to the case where the hands of the two users are inside the virtual item trade box 32.

In a space external to the virtual item trade box 32, even when the hands of the two users approach each other, the processing of moving the virtual item between the hands of the different users is not executed.

That is, the information processing apparatus executes the virtual item ownership transfer processing only in a case where the hands of the two users are inside the virtual Them trade box 32.

In a case where the hands or the two users are inside the virtual item trade box 32 and the virtual item has moved between the hands of the two users, moreover, the information processing apparatus updates the ownership registration information of the virtual item.

The information processing apparatus holds the user-owned item list in the storage unit, and executes processing of updating this list.

A specific example of the processing of updating the user-owned item list will be described with reference to FIG. 10.

Figure 10:
FIG. 10 is a diagram explaining an example of a user-owned item list stored in the storage unit of the information processing apparatus of the present disclosure.

FIG. 10 illustrates two user-owned item lists before and after the update processing as described below.

(3-1) User-owned item list (before update)
(3-2) User-owned item list (after update)

As illustrated in FIG. 10, the user-owned item list includes corresponding data of each data described below.

(a) User ID
(b) Owned item name
(c) The number of owned items

For example, in the first entry in (3-1) the user-owned item list (before update), (a) User I=001
(b) Owned item name=star
(c) The number of owned items=3

These registration data are recorded.

This is data indicating that the user of user ID=001 owns three virtual items (stars).

Figure 9:
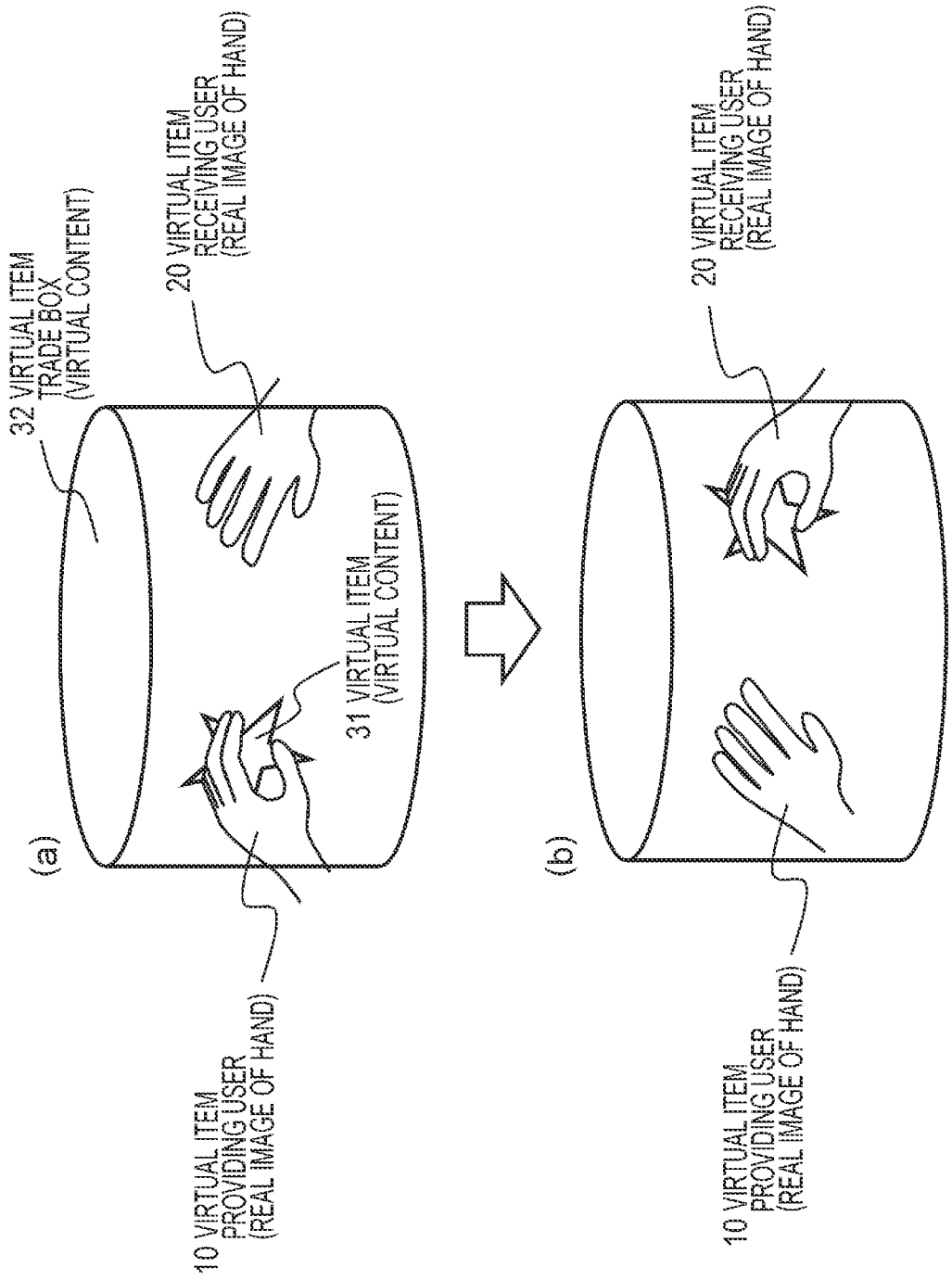
FIG. 9 is a diagram explaining an example of trade processing of a virtual item.

For example, when a trade of a virtual item (star) between users as described with reference to FIG. 9 is performed, the information processing apparatus executes the processing of updating the user-owned item list illustrated in FIG. 10.

It is assumed that the virtual item (star) has been provided from the user of user ID=001 to the user of user ID=002.

In this case, the information processing apparatus performs processing of changing the list registration data of (3-1) user-owned item list (before update)

to the list registration data of (3-2) user-owned item list (after update).

In (3-1) the user-owned item list (before update),
the number of owned items of virtual items (stars) of user ID=001=3, and
the number of owned items of virtual items (stars) of user ID=002=1.

When the virtual item (star) is provided from the user of user ID=001 to the user of user ID=002, the list update processing of changing the registration data as described below as indicated in (3-2) user-owned item list (after update) is executed.

The number of owned items of virtual items (stars) of user ID=001=2
The number of owned items of virtual items (stars) of user ID=002=2

In this way, the information processing apparatus performs the processing of updating the user-owned virtual item list stored in the storage unit at the time of the virtual item trade processing.

By such processing, the processing of trade of virtual items between users, that is, the ownership transfer processing can be safely and unfailingly executed.

In the processing of the present disclosure, the virtual item trade processing, that is, the ownership transfer processing is executed under the conditions described below.

(Condition 1) The virtual item receiving user is a user who is certified to be reliable by the virtual item providing user.

(Condition 2) Both the hand of the virtual item providing user and the hand of the virtual item receiving user who is a user who is certified to be reliable by the virtual item providing user are in the virtual item trade box.

The virtual item trade processing is possible only in a case where these two conditions (condition 1) and (condition 2) are satisfied.

By enabling the transfer of the ownership of the virtual item only under such certain conditions, it is possible to prevent the occurrence of an erroneous transfer of the ownership of the virtual item against the intention of the virtual item owner, or the like.

With the configuration of the present disclosure, in order to transfer the ownership of the virtual item, it is necessary for both the user who wants to assign the ownership of the virtual item and the user who wants to acquire the ownership of the virtual item to put the hands in the virtual item trade box. Therefore, after confirming that both the user who wants to assign the ownership of the virtual item and the user who wants to acquire the ownership of the virtual item have reached agreement of transfer of the ownership of the virtual item, the ownership of the virtual item can be transferred.

3. Regarding Configuration Example of the Information Processing Apparatus that Performs Virtual Content Display Control and Virtual Item Ownership Transfer Control Next, a configuration example of the information processing apparatus that performs virtual content display control and virtual item ownership transfer control is described.

In the processing example described with reference to FIGS. 1 to 4, the example in which the head mounted display (HMD) type transmissive AR image display device worn by the user is used as the information processing apparatus that performs the virtual content display control and the virtual item ownership transfer control has been described.

As described above, the information processing apparatus of the present disclosure can be realized as various apparatuses such as a PC, a smartphone, and a server in addition to the head mounted display (HMD) illustrated in FIG. 1 and other drawings.

Hereinafter, an example of various information processing apparatuses, that is, a specific example of the information processing apparatus that performs the virtual content display control and the virtual item ownership transfer control will be described.

Figure 11:
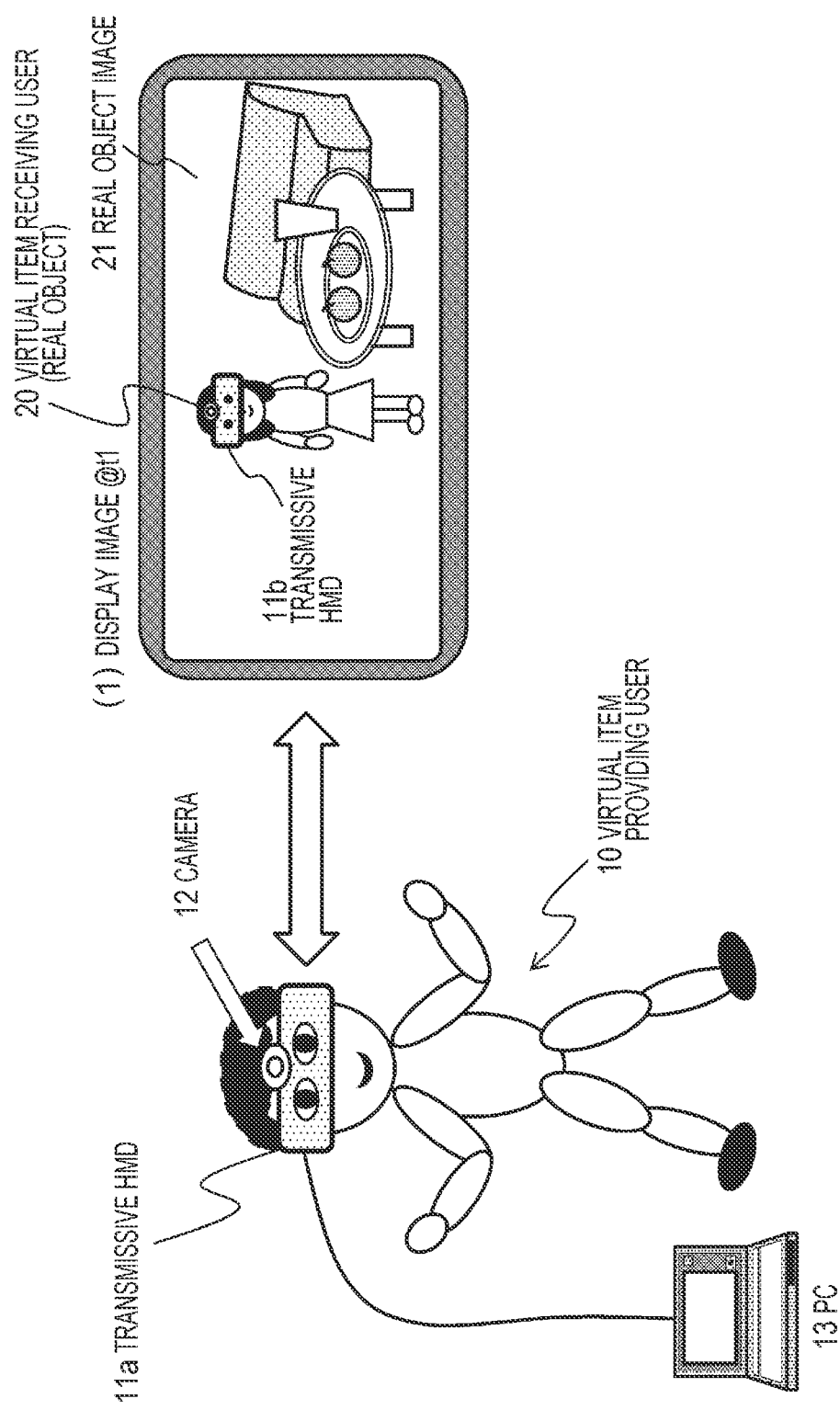
FIG. 11 is a diagram explaining a system configuration example of the information processing apparatus of the present disclosure.

FIG. 11 is an example in which a PC 13 connected to a head mounted display (HMD) is the information processing apparatus that performs the virtual content display control and the virtual item ownership transfer control.

The PC 13 controls the display data of the display unit of the head mounted display (HMD). That is, various virtual content such as a virtual item to be traded, the virtual item trade box, the user name of a trading target, an authentication identification mark, and the like are displayed on the display unit of the head mounted display (HMD), and the display control of such virtual contents is executed.

Moreover, the storage unit of the PC 13 stores the user list, the user-owned item list, and the inter-user credit information list described above with reference to FIGS. 6, 7, and 10, and the data processing unit of the PC 13 executes the virtual content display control and the virtual item ownership transfer control processing with reference to these lists.

Figure 12:
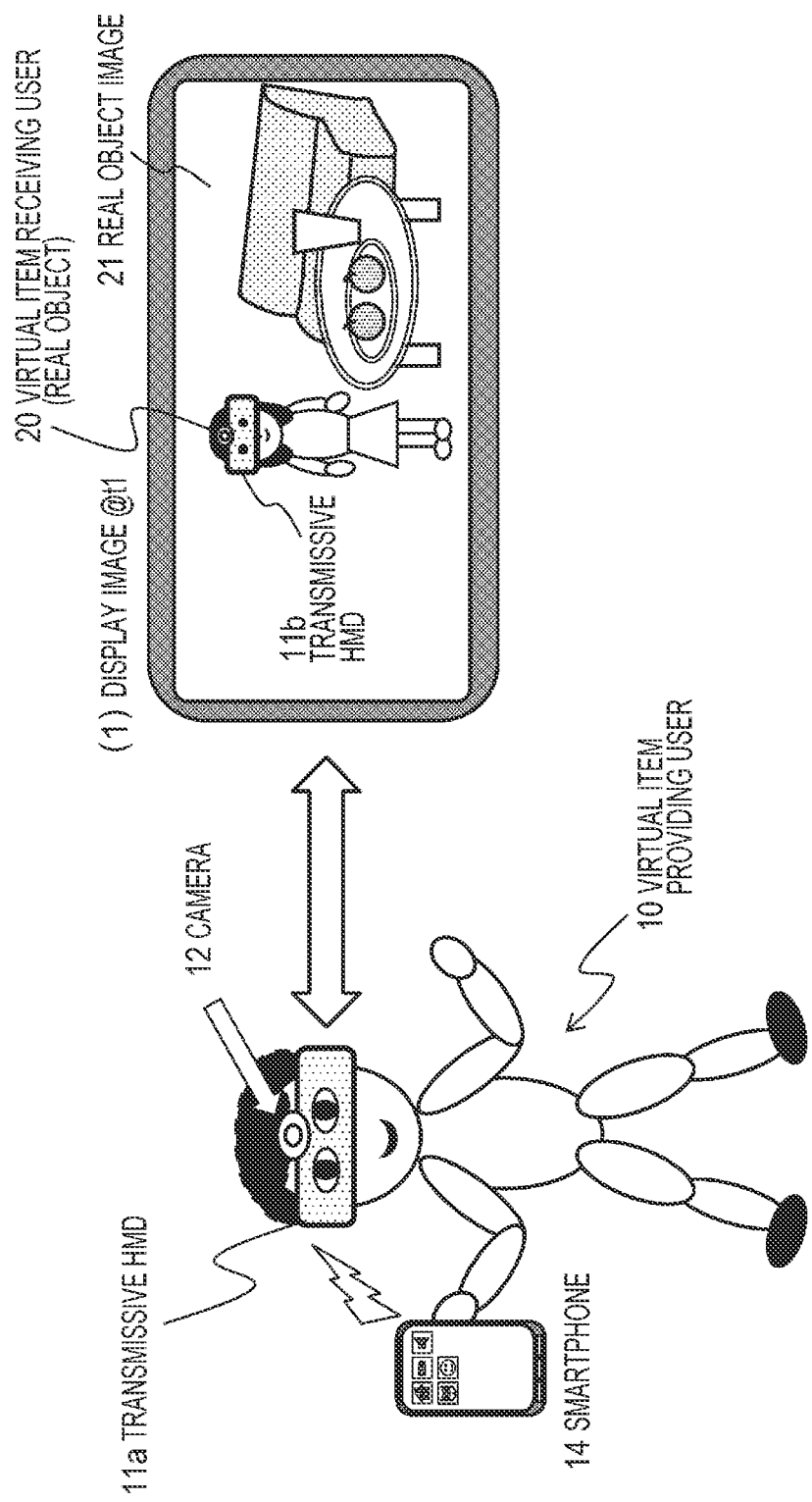
FIG. 12 is a diagram explaining a system configuration example of the information processing apparatus of the present disclosure.

FIG. 12 is an example in which a smartphone (smartphone) 14 that executes communication with a head mounted display (HMD) is the information processing apparatus that performs the virtual content display control and the virtual item ownership transfer control.

The smartphone 14 controls the display data of the display unit of the head mounted display (HMD). That is, various virtual content such as a virtual item to be traded, the virtual item trade box, the user name of a trading target, an authentication identification mark, and the like are displayed on the display unit of the head mounted display (HMD), and the display control of such virtual contents is executed.

Moreover, the storage unit of the smartphone 14 stores the user list, the user-owned item list, and the inter-user credit information list described above with reference to FIGS. 6, 7, and 10, and the data processing unit of the smartphone 14 executes the virtual content display control and the virtual item ownership transfer control processing with reference to these lists.

Figure 13:
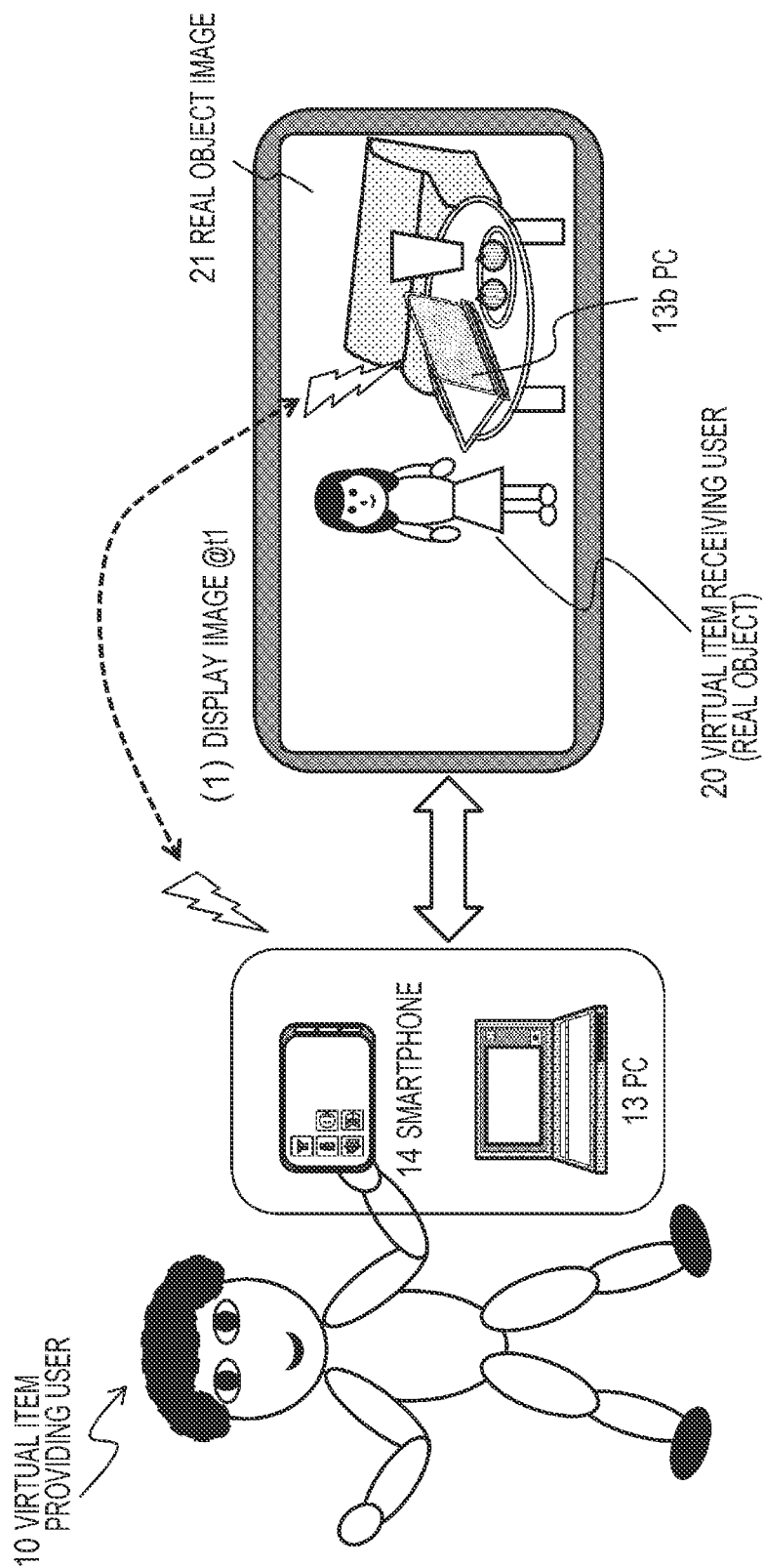
FIG. 13 is a diagram explaining a system configuration example of the information processing apparatus of the present disclosure.

FIG. 13 is a configuration in which a real image captured by the camera and virtual content are displayed on the display unit of the PC 13 or smartphone 14 without using the head mounted display (HMI)). The virtual content is superimposed and displayed on the real image captured by the camera provided in the PC 13 or smartphone 14.

The data processing unit of the PC 13 or smartphone 14 displays various virtual content such as a virtual item to be traded, the virtual item trade box, the user name of a trading target, an authentication identification mark, and the like on the display unit of the PC 13 or smartphone 14, and the display control of such virtual content is executed.

Moreover, the storage unit of the PC 13 or smartphone 14 stores the user list, the user-owned item list, and the inter-user credit information list described above with reference to FIGS. 6, 7, and 10, and the data processing unit of the PC executes the virtual content display control and the virtual item ownership transfer control processing with reference to these lists.

Note that the PC 13 or smartphone 14 communicates with a PC or smartphone of another distant user via a communication unit.

The PC 13 or smartphone 14 on the virtual item providing user 10 side executes communication with the apparatus on the virtual item receiving user 20 side at a distance from the virtual item providing user 10, and each apparatus executes the virtual content display control and the virtual item ownership transfer control processing with respect to the display unit of each apparatus.

Note that, in the example illustrated in FIG. 13, for example, a real image captured by a camera provided in a PC 13*b*, which is the information processing apparatus on the remote virtual item receiving user 20 side, can be displayed on the PC 13 or smartphone 14, which is the information processing apparatus on the virtual item providing user 10 side. The PC 13 or smartphone 14 can display a virtual item or a virtual trade box on this real image to control the trade of the virtual item.

That is, even with the virtual item receiving user 20 who is remote from the virtual item providing user 10, the virtual item ownership transfer processing can be performed by the processing similar to that described above with reference to FIGS. 1 to 4.

Figure 14:
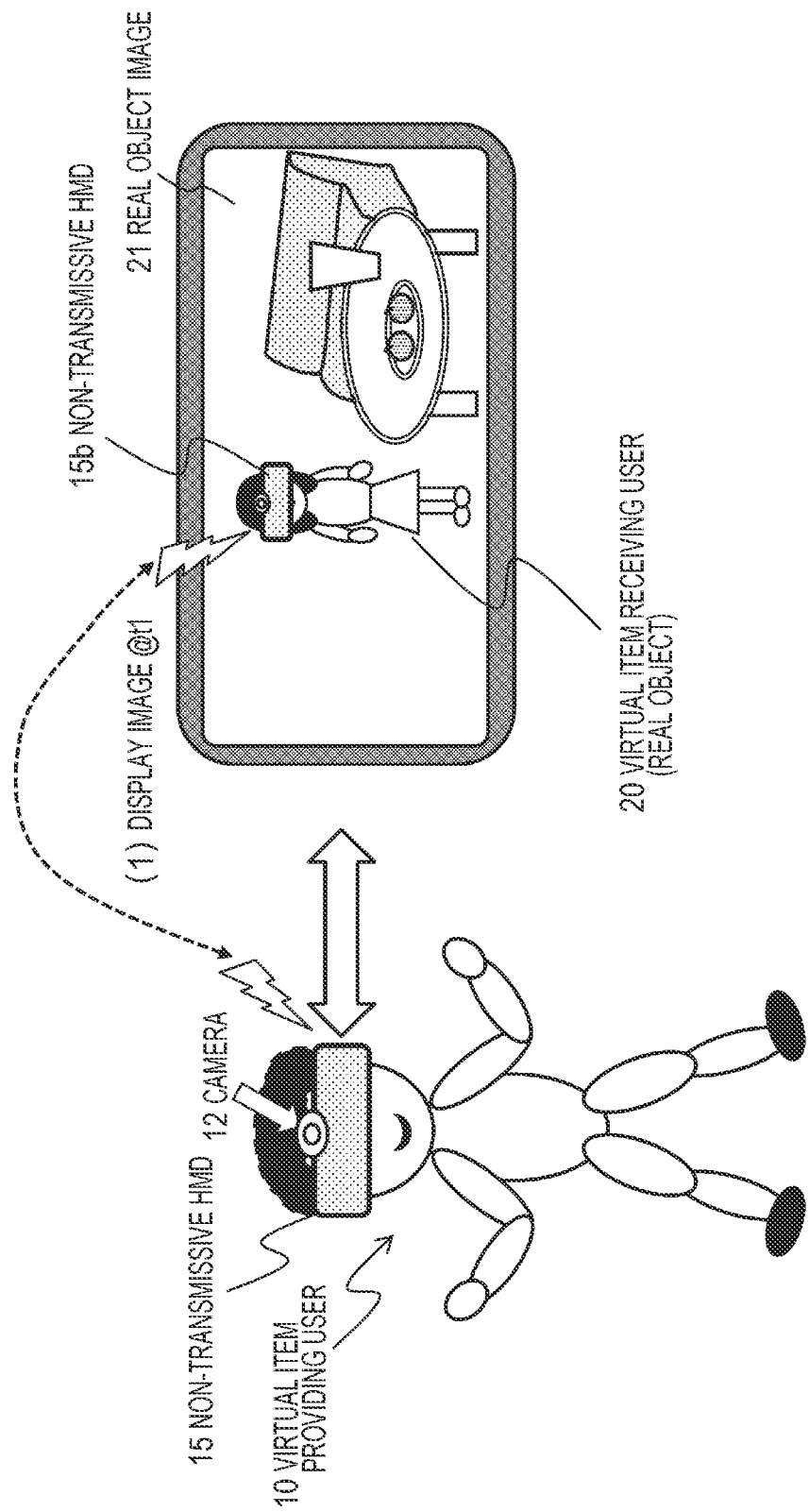
FIG. 14 is a diagram explaining a system configuration example of the information processing apparatus of the present disclosure.

The example illustrated in FIG. 14 is an example using a head mounted display (HMD), but it is an example in which the head mounted display (HMD) illustrated in FIG. 14 uses a non-transmissive HMD 15, not the transmissive HMD described above with reference to FIG. 1 and other drawings.

On the display unit of the non-transmissive HMD 15, a real object captured by the camera 12 provided in the non-transmissive HMD 15, and various virtual content such as a virtual item to be traded, the virtual item trade box, the user name of a trading target, an authentication identification mark, and the like are displayed.

Moreover, the data processing unit of the non-transmissive HMD 15 performs the virtual content display control and the virtual item ownership transfer control.

Even with this configuration, the non-transmissive HMD 15 can communicate with a non-transmissive HMD 15*b* of another distant user via the communication unit.

Furthermore, the display unit of the non-transmissive HMD 15 can display a real object captured by the camera 12 provided in the non-transmissive HMD 15*b* worn by the virtual item receiving user 20 who is remote from the virtual item providing user 10.

The non-transmissive HMD 15 on the virtual item providing user 10 side executes communication with the non-transmissive HMD 15*b* on the virtual item receiving user 20 side at a distance from the virtual item providing user 10, and each apparatus executes the virtual content display control and the virtual item ownership transfer control processing with respect to the display unit of each apparatus.

Also with the configuration illustrated in FIG. 14, similar to the configuration illustrated in FIG. 13 described above, even with the virtual item receiving user 20 who is remote from the virtual item providing user 10, the virtual item ownership transfer processing can be performed by the processing similar to that described above with reference to FIGS. 1 to 4.

Figure 15:
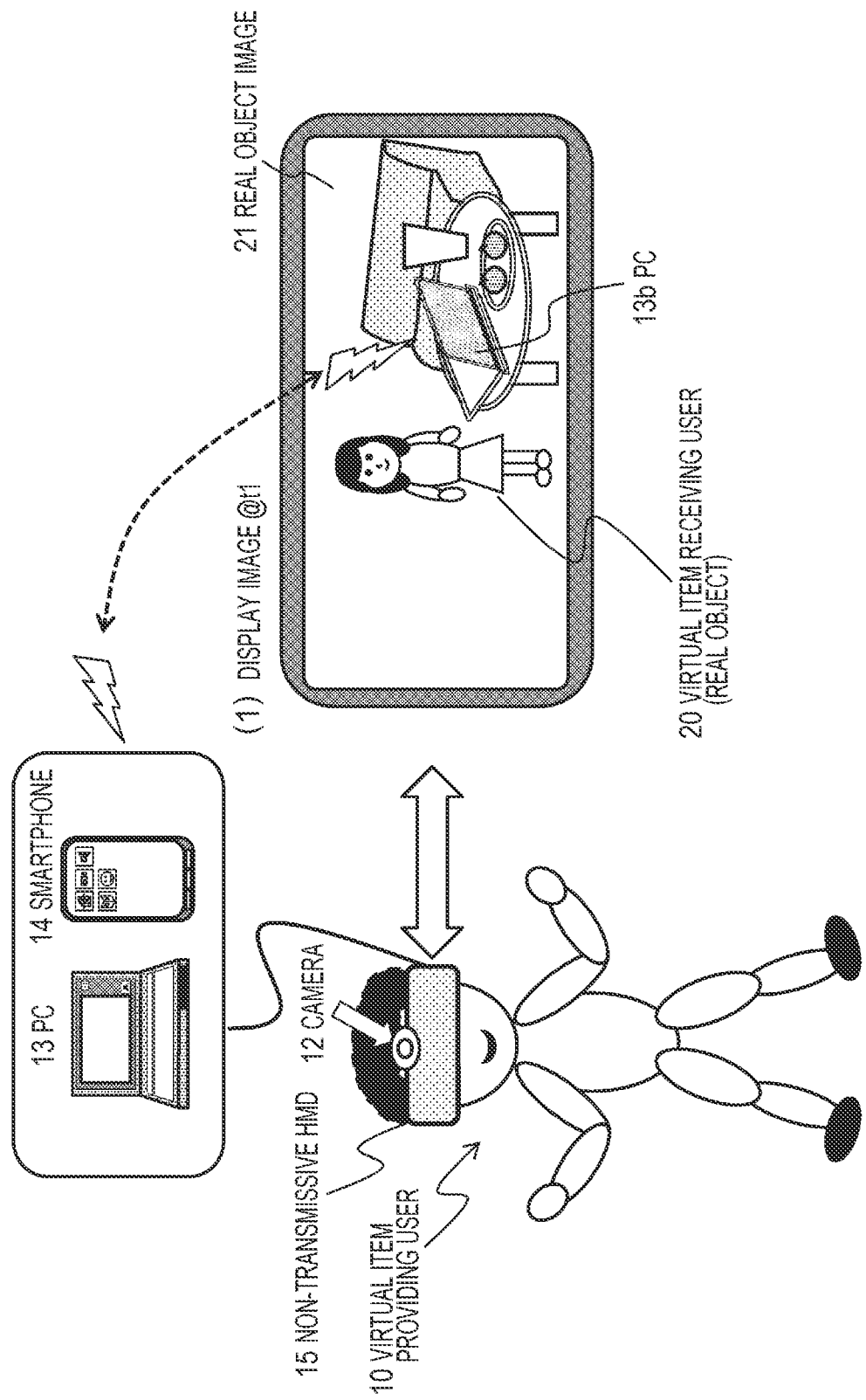
FIG. 15 is a diagram explaining a system configuration example of the information processing apparatus of the present disclosure.

The example illustrated in FIG. 15 is an example using the non-transmissive HMD 15 similar to that in FIG. 14. The non-transmissive HMD 15 illustrated in FIG. 15 is connected to the PC 13 or smartphone (smartphone) 14.

With the configuration illustrated in FIG. 15, the PC 13 or smartphone 14 connected to the non-transmissive HMD 15 performs the virtual content display control and the virtual item ownership transfer control.

The PC 13 or smartphone 14 controls the display data or the display unit of the non-transmissive HMD 15. That is, various virtual content such as a virtual item to be traded, the virtual item trade box, the user name of a trading target, an authentication identification mark, and the like are displayed on the display unit of the non-transmissive HMD 15, and the display control of such virtual contents is executed.

On the display unit of the non-transmissive HMD 15, a real object captured by the camera 12 provided in the non-transmissive HMD 15, and various virtual content such as a virtual item to be traded, the virtual item trade box, the user name of a trading target, an authentication identification mark, and the like are displayed.

Moreover, the storage unit of the PC 13 or smartphone 14 stores the user list, the user-owned item list, and the inter-user credit information list described above with reference to FIGS. 6, 7, and 10, and the data processing unit of the PC 13 or smartphone 14 executes the virtual content display control and the virtual item ownership transfer control processing with reference to these lists.

Also with this configuration, the PC 13 or smartphone 14 can communicate with the information processing apparatus of another distant user, for example, an information processing apparatus such as an HMD, a PC, or a smartphone, via the communication unit.

The information processing apparatus such as the PC 13 or smartphone 14 on the virtual item providing user 10 side executes communication with the information processing apparatus on the virtual item receiving user 20 side at a distance from the virtual item providing user 10, and the information processing apparatus of each user executes the virtual content display control and the virtual item ownership transfer control processing.

Also with the configuration illustrated in FIG. 15, similar to the configurations illustrated in FIGS. 13 and 14 described above, even with the virtual item receiving user 20 who is remote from the virtual item providing user 10, the virtual item ownership transfer processing can be performed by the processing similar to that described above with reference to FIGS. 1 to 4.

Figure 16:
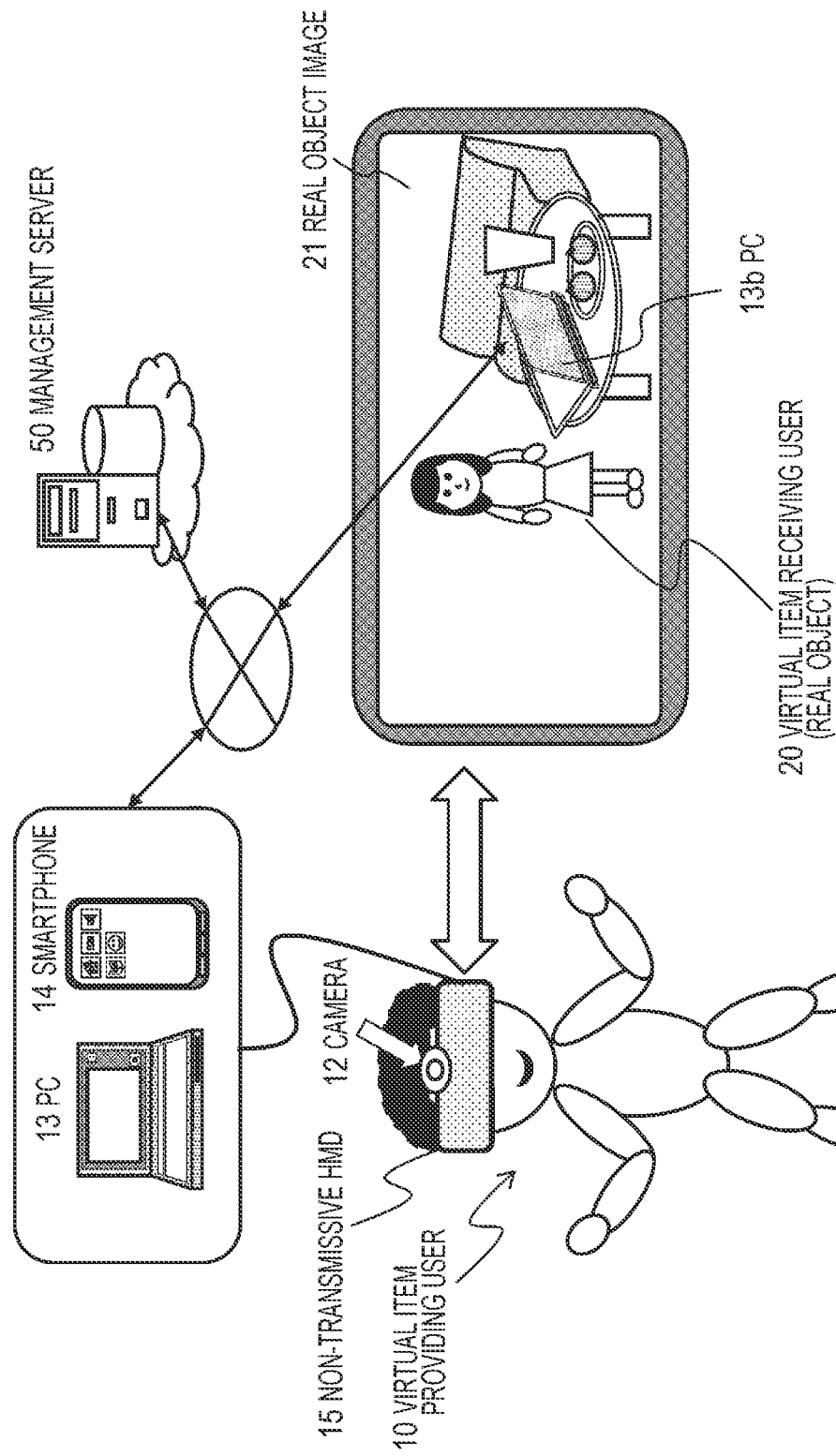
FIG. 16 is a diagram explaining a system configuration example of the information processing apparatus of the present disclosure.

The example illustrated in FIG. 16 is a configuration example having a management server 50 connected to a plurality of user terminals, for example, user terminals such as an HMD, a PC, or a smartphone.

With this configuration, the management server 50 controls the display data of the display unit of the user terminal (HMD, PC, smartphone, or the like) connected to the network. That is, various virtual content such as a virtual item to be traded, the virtual item trade box, the user name of a trading target, an authentication identification mark, and the like are displayed on the display unit of each user terminal, and the display control of such virtual contents is executed.

With this configuration, the storage unit of the management server 50 stores the user list, the user-owned item list, and the inter-user credit information list described above with reference to FIGS. 6, 7, and 10, and the data processing unit of the management server 50 executes the virtual content display control and the virtual item ownership transfer control processing with respect to each user terminal with reference to these lists.

With this configuration, the user terminal such as a HMD, a PC, or a smartphone can communicate with the management server 50 or the user terminal of another user via the communication unit. It is possible to execute communication directly or via the management server 50 with the information processing apparatus on the virtual item receiving user 20 side at a distance from the virtual item providing user 10.

With this configuration, the management server 50 executes the virtual content display control and the virtual item ownership transfer control processing of the user terminal.

Figure 17:
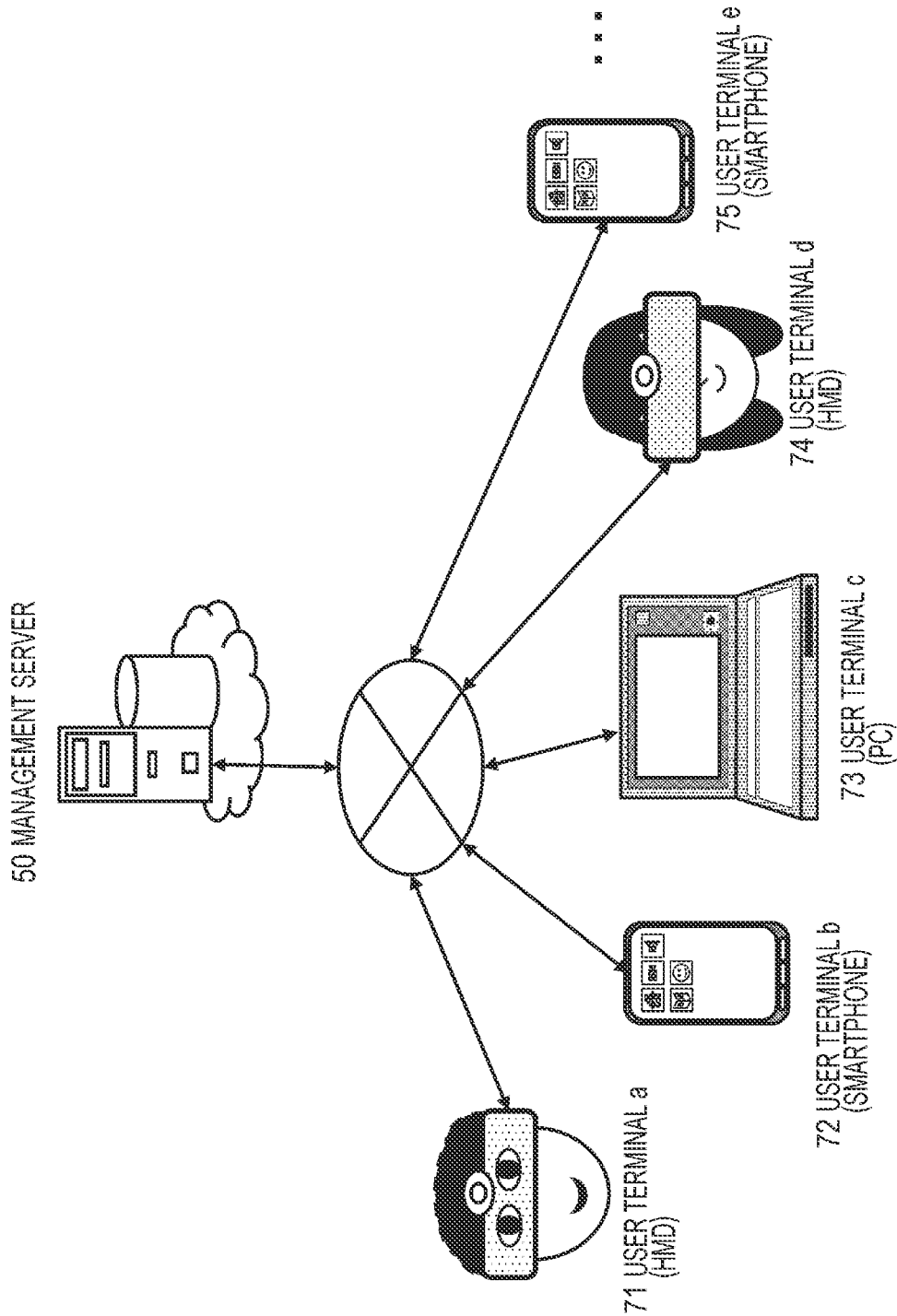
FIG. 17 is a diagram explaining a system configuration example of the information processing apparatus of the present disclosure.

FIG. 17 is a diagram illustrating an example of a network configuration having a configuration in which the management server 50 illustrated in FIG. 16 controls display content of user terminals connected to the network.

As illustrated in FIG. 17, the management server 50 is connected to various user terminals 71 to 75 such as an HMD, a smartphone, or a PC, and executes communication with each user terminal.

The management server 50 executes the virtual content display control and the virtual item ownership transfer control processing with respect to the display unit of each of the user terminals 71 to 75.

4. Regarding Configuration Example of the Information Processing Apparatus

Next, a configuration example of the information processing apparatus of the present disclosure will be described.

As described above, the information processing apparatus of the present disclosure includes, for example, a PC, a smartphone, a non-transmissive HMD, a server, or the like, in addition to the transmissive HMD illustrated in FIG. 1. These information processing apparatuses execute control of display of virtual content on the display unit observed by the user, control of the ownership transfer processing of a virtual item, which is one of the virtual contents, and the like.

Figure 18:
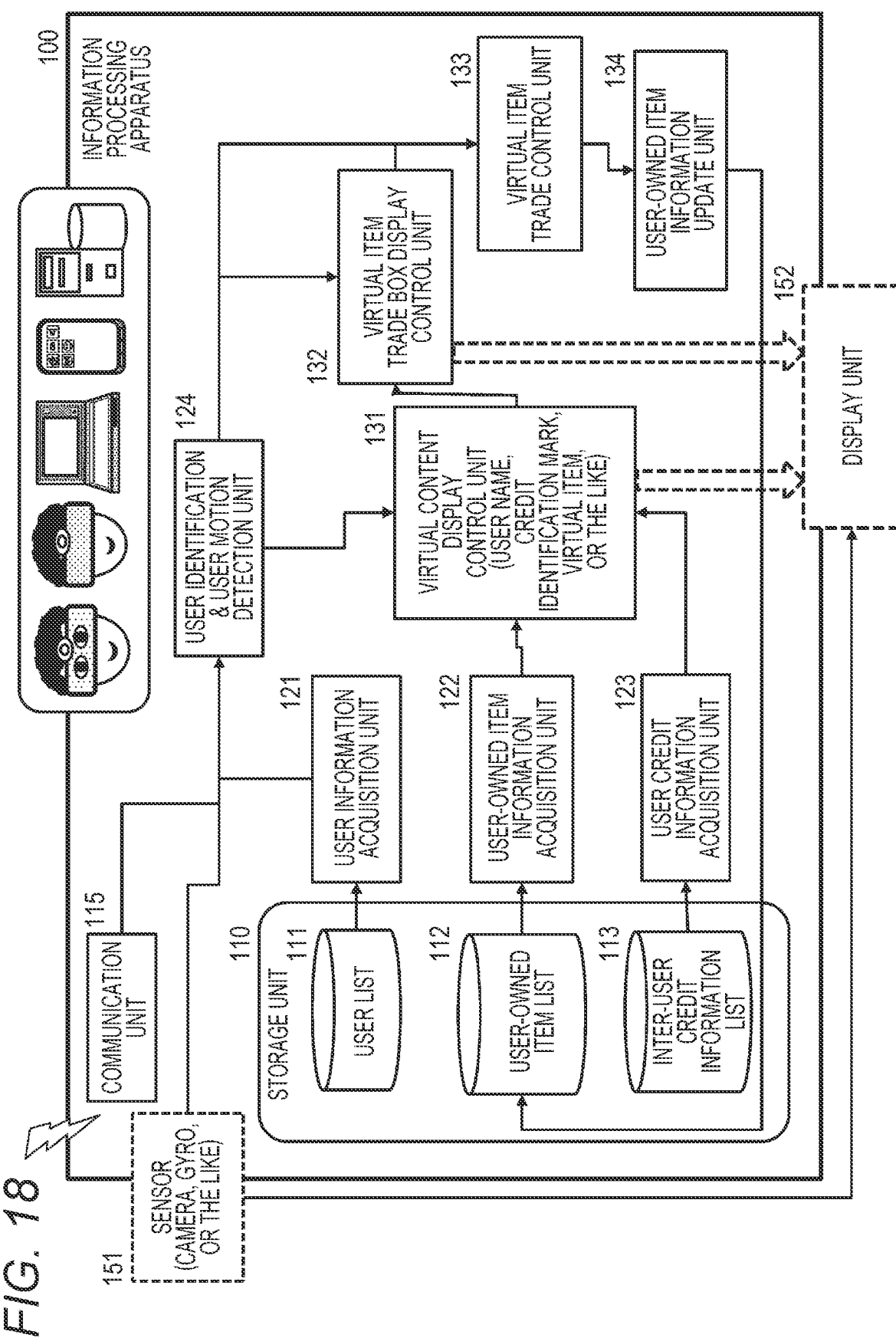
FIG. 18 is a diagram explaining a configuration example of the information processing apparatus of the present disclosure.

FIG. 18 illustrates one configuration example of an information processing apparatus 100 of the present disclosure.

The information processing apparatus 100 illustrated in FIG. 18 is, for example, any apparatus of a transmissive HMD, a PC, a smartphone, a non-transmissive HMD, and a server.

As illustrated in FIG. 18, the information processing apparatus 100 includes a storage unit 110, a communication unit 115, a user information acquisition unit 121, a user-owned item information acquisition unit 122, a user credit information acquisition unit 123, a user identification & user motion detection unit 124, a virtual content display control unit 131, a virtual item trade box display control unit 132, a virtual item trade control unit 133, a user-owned item information update unit 134, a sensor 151, and a display unit 152.

Note that the storage unit 110 stores a user list 111, a user-owned item list 112, and an inter-user credit information list 113. These are the lists described above with reference to FIGS. 6, 7, and 10.

Note that each constituting unit of the information processing apparatus 100 illustrated in FIG. 18 may be configured to be arranged in a distributed manner among a plurality of information processing apparatuses. In that case, communication is executed between the components arranged in a distributed manner to perform the processing.

For example, the sensor 151 or the display unit 152 may be configured on the user terminal such as an HMD, and other components may be configured to be arranged on a PC, a smartphone, or a management server.

Each component of the information processing apparatus 100 illustrated in FIG. 18 will be described.

The user information acquisition unit 121 acquires the user list 111 of the storage unit 110 and outputs it to the user identification & user motion detection unit 124 and the virtual content display control unit 131.

The user identification & user motion detection unit 124 inputs sensor detection information of the sensor (camera, gyro, or the like) 151, for example, camera capture information, and moreover, performs the user identification processing by comparison processing with a face image registered in the user list 111.

Specifically, the user identification processing of the virtual item receiving user who is the trading target of the virtual item is executed.

The user identification & user motion detection unit 124 executes the user identification processing with reference to the user list 211 stored in the storage unit 110.

As described above with reference to FIG. 6, data described below are registered in association with each other in the user list 111.
(a) User ID
(b) User name
(c) User face image The user who uses the system of the present disclosure executes user registration in advance. Specifically, the processing of registering the user name and the face image is performed.

In a case where a new user is detected in the display unit, the user identification & user motion detection unit 124 first executes the processing of identifying the user.

As described above, the ID and position of the virtual item receiving user 20 can be identified by the ID and position set in the transmissive HMD 11b worn by the virtual item receiving user 20.

Alternatively, a configuration in which a camera-captured image captured by the camera is compared with the face image registered in the user list 111 and a registered face image having a high degree of matching with the captured image is extracted may be possible, for example.

The virtual content display control unit 131 acquires the user name recorded in the entry of the registered face image extracted by the user identification & user motion detection unit 124, and displays the acquired user name as virtual content on the AR image.

Moreover, the user identification. & user motion detection unit 124 detects the user's motion, for example, the user's position, the user's hand motion, position, or the like, on the basis of the input information from the sensor (camera, gyro, or the like) 151.

Note that in the configuration for communicating with an external user terminal or information processing apparatus, the user identification & user motion detection unit 124 inputs detection information of the sensor (camera, gyro, or the like) provided in the external user terminal or information processing apparatus, for example, camera capture information, via the communication unit 115 and performs the identification processing or position and motion detection of a remote user.

The user identification information and the user motion information (user position, hand position, motion information, or the like) generated by the processing of the user identification & user motion detection unit 124 are input to the virtual content display control unit 131.

The user-owned item information acquisition unit 122 reads the user-owned item list 112 stored in the storage unit 110 and inputs it to the virtual content display control unit 131.

The user credit information acquisition unit 123 reads the inter-user credit information list 113 stored in the storage unit 110 and inputs it to the virtual content display control unit 131.

The virtual content display control unit 131 inputs each information described below.

(1) The user identification information and user motion information (user position, hand position, motion information, or the like) from the user identification & user motion detection unit 124

(2) The user-owned item list 112 from the use item information acquisition unit 122

(3) The inter-user credit information list 113 from the user credit information acquisition unit 123

The virtual content display control unit 131 performs the virtual content display control with respect to the display unit 152 on the basis of each of these pieces of information.

Specifically, for example, the display control of virtual content such as the user name, the authentication identification mark, and the virtual item described above with reference to FIGS. 1 to 4 is executed.

The virtual content display control unit 131 displays and moves the virtual item, which is the virtual content to be traded, in accordance with the hand motion of the virtual item providing user input from the user identification & user motion detection unit 124.

Moreover, the virtual content display control unit 131 performs the processing of displaying the user name registered in the user list 111 near the detected user as virtual content on the basis of the user identification information of the virtual item receiving user or another detected user input from the user identification & user motion detection unit 124.

For example, the user name such as [Alice] described above with reference to FIGS. 1 to 4 is displayed.

Moreover, the virtual content display control unit 131 executes the authentication processing (credibility confirmation processing) with respect to the trading target (virtual item receiving user) for which user identification has succeeded.

Only in a case where the authentication processing (credibility confirmation processing) with respect to this trading target (virtual item receiving user) is successful and it is determined that the trading target (virtual item receiving user) is a credible user, the authentication identification mark (a badge or the like) is displayed near the trading target (virtual item receiving user).

Note that the authentication identification mark display control is executed with reference to the inter-user credit information list 112 stored in the storage unit 110. As described above with reference to FIG. 7, the inter-user credit information list 112 includes the two lists described below.

(1) Credit user is
(2) Rejected user list

In a case where the user ID of the trading target (virtual item receiving user) is registered as the "credit user" of the virtual item providing user in the credit user list illustrated in (2a) of FIG. 7, it is determined that the trading target (virtual item receiving user) is a "credit user". In this case, the authentication identification mark (a badge or the like) is displayed near the trading target (virtual item receiving user).

In a case where there is a user determined to be a "credit user", the virtual content display control unit 131 outputs the "credit user" detection information to the virtual item trade box display control unit 132.

The virtual item trade box display control unit 132 executes the display control with respect to the display unit 152 of the virtual item trade box 32 described above with reference to FIGS. 1 to 4.

When the virtual item providing user approaches an authenticated trading target (virtual item receiving user) in a state of holding the virtual item (or marker associated with the virtual item) to be traded in the hand, the virtual item trade box display control unit 132 displays the virtual item trade box in the vicinity of the trading target (virtual item receiving user).

As described above, the display conditions of the virtual item trade box are, for example, the conditions described below.

(a) The distance between the "credit user" for which the "authentication identification mark" is displayed and the virtual item providing user is equal to or less than the predetermined threshold value distance.

The virtual item trade box display control unit 132 executes the processing of displaying the virtual item trade box, for example, in a case where it is determined that the condition (a) described above is satisfied.

Note that, as described above, the display condition of the virtual item trade box is not limited to the condition (a) described above, but may be, for example, the condition (b) described below.

(b) The "credit user" for which the "authentication identification mark" is displayed is displayed within a specified region of the transmissive AR image display device worn by the virtual item providing user.

For example, it is also possible to set the virtual item trade box to be displayed in a case where the condition (b) described above is satisfied.

The virtual item trade control unit 133 controls the trade of the virtual item. Specifically, the control of the processing of transferring the ownership of the virtual item from the virtual item providing user to the virtual item receiving user is executed.

In a case where the fact that the processing of handing the virtual item to the trading target (virtual item receiving user) has been performed in a state where both the virtual item providing user and the virtual item receiving user put the hands in the virtual item trade box is detected, the virtual item trade control unit 133 determines that the ownership of the virtual item has been transferred.

Specifically, for example, as described above with reference to FIG. 9, in a case where it is confirmed that both the virtual item providing user and the virtual item receiving user put the hands in the virtual item trade box, the virtual item providing user opens the hand from the state of holding the virtual item, and the virtual item receiving user turns into the state of holding the virtual item from the state of opening the hand, it is determined that the ownership of the virtual item has been transferred.

In a case where the virtual item trade control unit 133 determines that the ownership of the virtual item has been transferred, the virtual item trade control unit 133 outputs the determination information to the user-owned item information update unit 134.

The user-owned item information update unit 134 executes the processing of updating the registration data of the user-owned item list 112 of the storage unit 110 on the basis of the virtual item ownership transfer information input from the virtual item trade control unit 133.

This processing is, for example, processing of updating the user-owned item list described above with reference to FIG. 10.

By such processing, the processing of trade of virtual items between users, that is, the ownership transfer processing can be safely and unfailingly executed.

5. Regarding Processing Sequence Executed by the Information Processing Apparatus of the Present Disclosure Next, the processing sequence executed by the information processing apparatus of the present disclosure will be described with reference to the flowchart illustrated in FIG. 19 and subsequent drawings.

Figure 19:
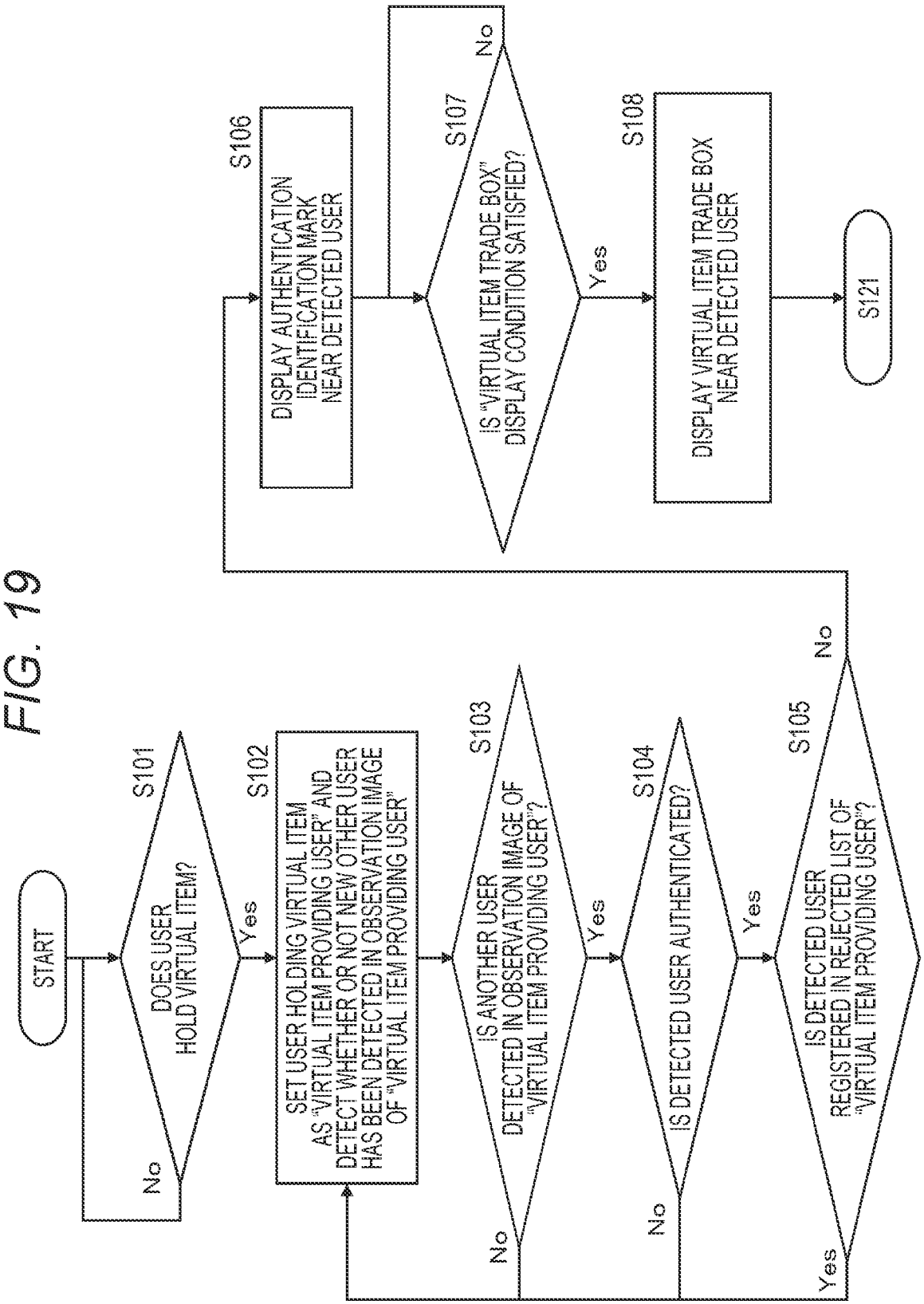
FIG. 19 is a diagram illustrating a flowchart explaining a sequence of processing executed by the information processing apparatus of the present disclosure.

Note that the processing according to the flowchart of FIG. 19 and subsequent drawings is executed in the data processing unit of the information processing apparatus. The data processing unit includes a CPU having a program execution function, and can execute the processing according to the flow according to a program stored in the storage unit.

The processing of each step of the flow illustrated in FIG. 19 and subsequent drawings will be described.
(Step S101)

First, the data processing unit of the information processing apparatus determines in step S101 whether or not the user has a virtual item.

Note that a user (virtual item providing user) who intends to provide a virtual item to another user acquires the virtual item owned by the user in advance and performs an operation of holding the virtual item in the hand. By this operation, the virtual item is displayed in the state of being held in the hand of the user virtual item providing user).
(Steps S102 to S103)

Next, in steps S102 to S103, the data processing unit of the information processing apparatus sets the user having the virtual item as the "virtual item providing user" and detects whether or not a new other user has been detected in an observation image of the "virtual item providing user".

In a case where a new other user detected in the observation image of the "virtual item providing user", the processing proceeds to step S104.
(Step S104)

Next, in step S104, the data processing unit of the information processing apparatus determines whether or not the detected user has been authenticated. Specifically, it is determined whether or not the detected user is a user registered in the credit user list of the "virtual item providing user".

The credit user list is the list described above with reference to (2-1) of FIG. 7.

In a case where the detected user is registered in the credit user list of the "virtual item providing user", it is determined that the detected user has been authenticated, and the processing proceeds to step S105.
(Step S105)

Next, in step S105, the data processing unit of the information processing apparatus determines whether or not the detected user is a user registered in the rejected user list of the "virtual item providing user".

The rejected user list is the list described above with reference to (2-2) of FIG. 7.

In a case where the detected user is registered in the rejected user list of the "virtual item providing user", the processing of step S106 and subsequent steps is not executed, and the processing returns to step S102.

In this case, the virtual item trade processing with the detected user is not executed.

In a case where the detected user is not registered in the rejected user list of the "virtual item providing user", the processing proceeds to step S106.
(Step S106)

Next, in step S106, the data processing unit of the information processing apparatus displays the authentication identification mark near the detected user.

For example, it is the authentication identification mark described in FIGS. 1 to 4.
(Steps S107 to S108)

Next, the data processing unit of the information processing apparatus determines in step S107 whether or not the display condition of the "virtual item trade box" is satisfied, and, in step S108, in a case where it is determined that the display condition is satisfied, displays the virtual item trade box near the detected user.

Note that as the display condition of the "virtual item trade box", various condition settings can be made as described above.

(a) The distance between the "credit user" for which the "authentication identification mark" is displayed and the virtual item providing user is equal to or less than the predetermined threshold value distance, and (b) The "credit user" for which the "authentication identification mark" is displayed is displayed within the specified region of the transmissive AR image display device worn by the virtual item providing user.

For example, in a case where any of the conditions (a) and (b) described above is satisfied, the virtual item trade box is displayed near the detected user step S108.

The determination sequence of each of the conditions (a) and (b) described above will be described with reference to the flow illustrated in FIG. 20.

Figure 20:
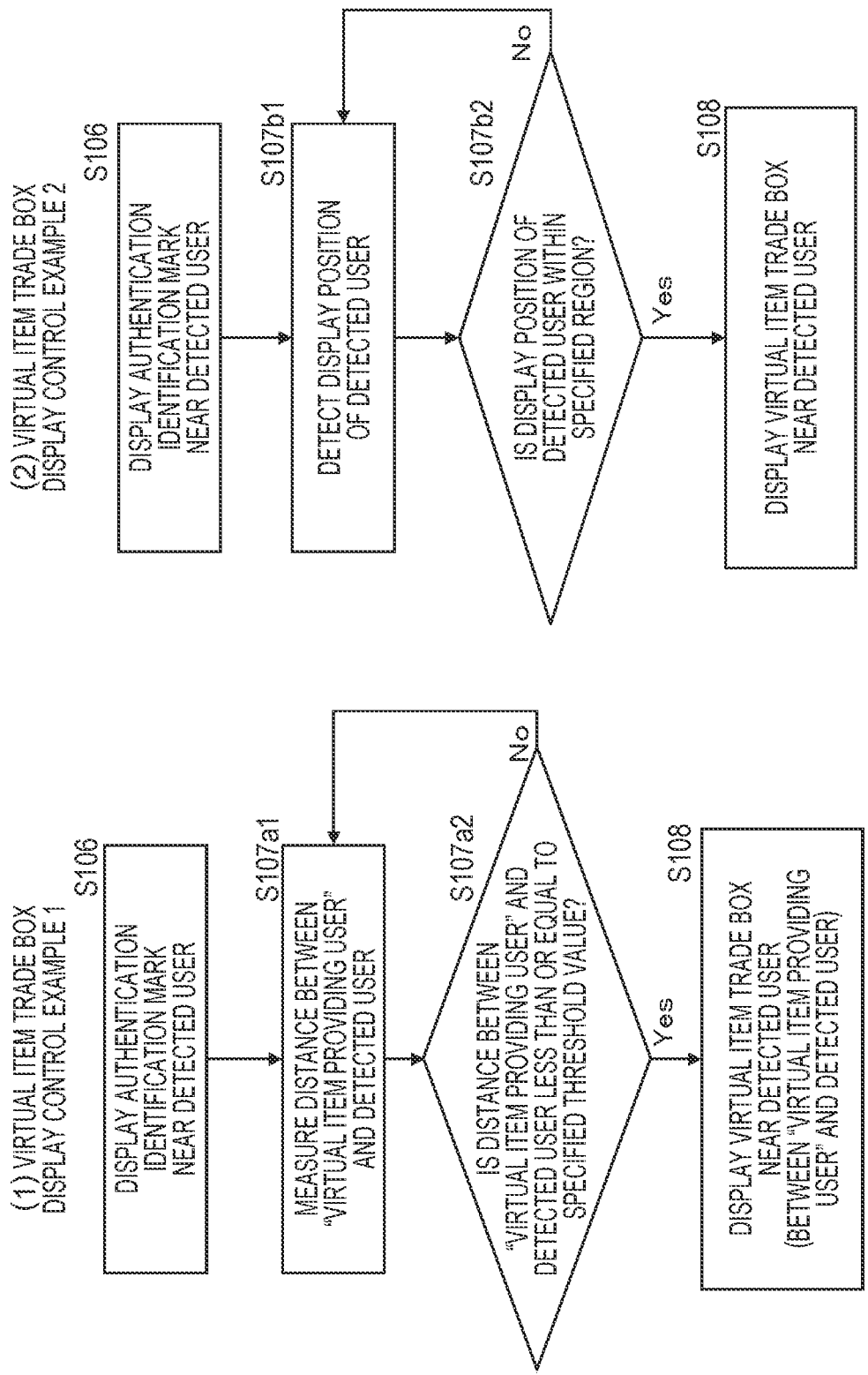
FIG. 20 is a diagram illustrating a flowchart explaining a sequence of processing executed by the information processing apparatus of the present disclosure.

FIG. 20 illustrates a flow explaining the two pieces of processing described below.

(1) Virtual item trade box display control example 1

(2) Virtual item trade box display control example 2

(1) Virtual item trade box display control example 1 corresponds to the determination sequence of the condition (a) described above.

(2) Virtual item trade box display control example 2 corresponds to the determination sequence of the condition (b) described above.

Both correspond to the processing of steps S106 to S106 of the flow illustrated in FIG. 19.

First, the flow of (1) virtual item trade box display control example 1 of FIG. 20 will be described.

(Step S106)

In step S106, the data processing unit of the information processing apparatus displays the authentication identification mark near the detected user.

For example, it is the authentication identification mark described in FIGS. 1 to 4.

(Step S107a1)

Next, in step 3107a1, the data processing unit of the information processing apparatus measures the distance between the "virtual item providing user" and the detected user.

(Step S107a2)

Seat, in step S107a2, the data processing unit of the information processing apparatus determines whether or not the distance between the "virtual item providing user" and the detected user is equal to or less than the predetermined threshold value.

In a case where it is determined that it is equal to or less than the specified threshold value, the processing proceeds to step S108.

(Step S108)

In a case where it is determined in step S107a2 that the distance between the "virtual item providing user" and the detected user is equal to or less than the predetermined threshold value, the data processing unit of the information processing apparatus displays the virtual item trade box near the detected user and at the position between the virtual item providing user and the detecting user in step S108.

Next, the sequence of (2) virtual item trade box display control example 2 of FIG. 20 will be described.

(Step S106)

In step S106, the data processing unit of the information processing apparatus displays the authentication identification mark near the detected user.

For example, it is the authentication identification mark described in FIGS. 1 to 4.

(Steps S107b1 to S107b2)

Next, the data processing unit of the information processing apparatus detects the display position of the detected user in step S107b1.

In a case where it is determined in step S107b2 that the display position of the detected user is within the predetermined display region, the processing proceeds to step S108.

This display position is a display position on the display unit being observed by the "virtual item providing user".

A specific example will be described with reference to FIG. 21.

Figure 21:
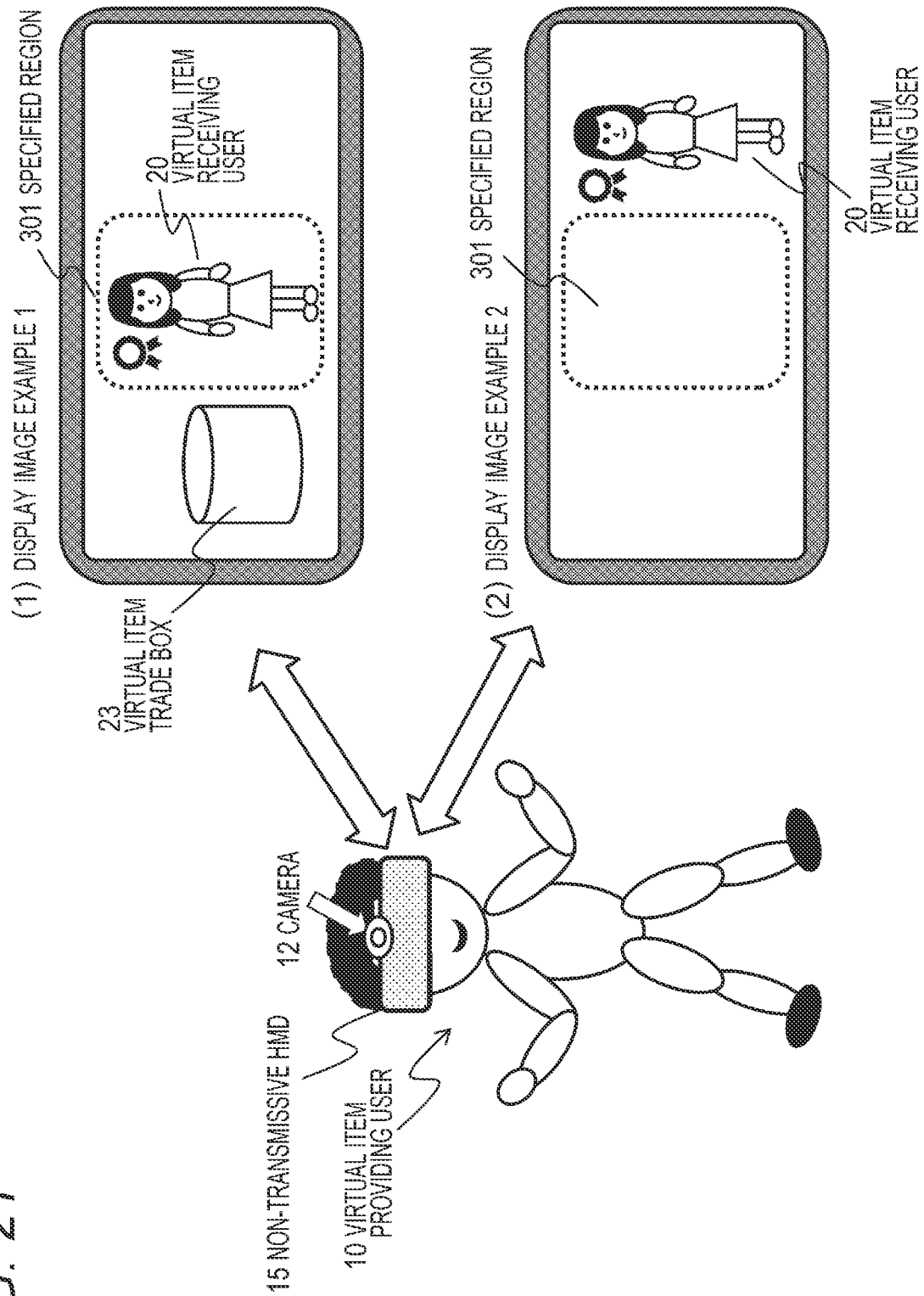
FIG. 21 is a diagram explaining an example of display control of a virtual item trade box.

FIG. 21 illustrates two display image examples of the non-transmissive HMD 15 worn by the virtual item providing user 10.

In each of the display images, the virtual item receiving user 20, who is the detected user, is displayed.

(1) Display image example 1 is a state in which the virtual item receiving user 20, who is the detected user, is displayed in a predetermined specified region 301.

In this case, the data processing unit of the information processing apparatus determines in step S107b2 that the display position of the detected user is within the predetermined display region, proceeds to step S108, and displays the virtual item trade box at a position near the detected user.

On the other hand, (2) display image example 2 is a state in which the virtual item receiving user 20, who is the detected user, is displayed outside the predetermined specified region 301.

In this case, the data processing unit of the information processing apparatus determines in step S107b2 that the display position of the detected user is not within the predetermined display region, and does not proceed to step S108, but returns to step S107b1. In this case, the virtual item trade box is not displayed.

(Step S108)

In a case where it is confirmed in step S107b2 that the detected user is displayed within the predetermined specified region, the data processing unit of the information processing apparatus displays the virtual item trade box at a position near the detected user in step S108.

Note that as the display condition of the virtual item trade box, various conditions can be set in addition to the above.

Figure 22:
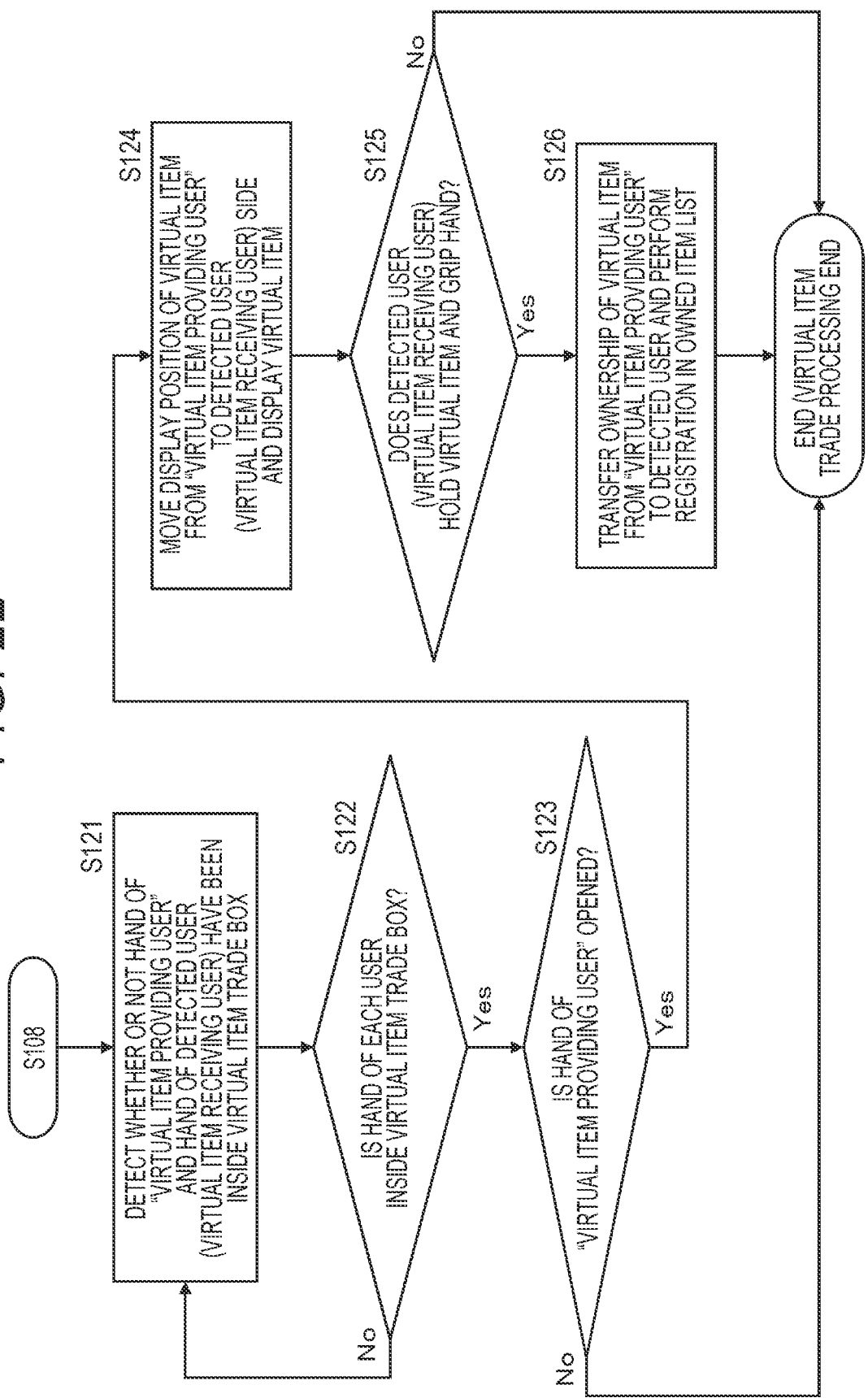
FIG. 22 is a diagram illustrating a flowchart explaining a sequence of processing executed by the information processing apparatus of the present disclosure.

Next, the processing after displaying the virtual item trade box will be described with reference to the flowchart illustrated in FIG. 22.

(Steps 121 to S122)

After the virtual item trade box is displayed in step S108, the information processing apparatus detects whether or not the hand of the "virtual item providing user" and the hand of the detected user (virtual item receiving user) have been inside the virtual item trade box in step S121. This is detected, for example, on the basis of a camera-captured image.

In a case where it is determined in step S122 that the hand of the "virtual item providing user" and the hand of the detected user (virtual item receiving user) have been inside the virtual item trade box, the processing proceeds to step S123.

(Step S123)

In a case where it is determined in step S122 that the hand of the "virtual item providing user" and the hand of the detected user (virtual item receiving user) hate been inside the virtual item trade box, the information processing apparatus determines in step S123 whether or not the hand of the "virtual item providing user" has been opened.

This is determined, for example, on the basis of a camera-captured image.

In a case where it is determined that the hand of the "virtual item providing user" has been opened, the processing proceeds to step S124.

Note that the waiting time until this determination processing is predetermined, for example, 10 seconds from the time when the hand of the "virtual item providing user" and the hand of the detected user (virtual item receiving user) are determined to have been inside the virtual item trade box.

In a case where it is not determined that the hand of the "virtual item providing user" has been opened within the specified waiting time, the processing is completed. In this case, the virtual item ownership transfer processing is not executed.

In a case where it is determined that the hand of the "virtual item providing user" has been opened within the specified time, the processing proceeds to step S124.

(Step S124)

Next, in step S124, the information processing apparatus moves the display position of the virtual item from the position of the hand of the "virtual item providing user" to the position of the hand of the detected user (virtual item receiving user) and displays the virtual item.

(Step S125)

Next, in step S125, the information processing apparatus determines whether or not the detected user (virtual item receiving user) has held the virtual item in the hand and performed the gripping operation. This determination processing is executed, for example, on the basis of a camera-captured image.

In a case where it is determined in step S125 that the detected user (virtual item receiving user) has held the virtual item in the hand and performed the gripping operation, the processing proceeds to step S126.

On the other hand, in a case where it is determined in step S125 that the detected user (virtual item receiving user) has not held the virtual item in the hand or performed the gripping operation, the processing ends.

Note that the waiting time until this determination processing is also predetermined. For example, the waiting time is predetermined, for example, 10 seconds after the display position of the virtual item moves to the position of the hand of the detected user (virtual item receiving user).

In a case where it is not determined that the "virtual item receiving user" has gripped the hand within the specified waiting time, the processing ends. In this case, the virtual item ownership transfer processing is not executed.

In a case where it is determined that the "virtual item receiving user" has gripped the hand within the specified time, the processing proceeds to step S126.

(Step S126)

Next, in step S126, the information processing apparatus transfers the ownership of the virtual item from the "virtual item providing user" to the detected user and registers it in the user-owned item list.

That is, the processing of updating the user-owned item list described above with reference to FIG. 10 is executed.

By such processing, the processing of trade of virtual items between users, that is, the ownership transfer processing can be safely and unfailingly executed.

6. Regarding Specific Example of Processing of Transfer of Ownership of Virtual Item Next, a specific processing example of the virtual item ownership transfer processing executed by the information supplement processing apparatus of the present disclosure will be described.

Figure 23:
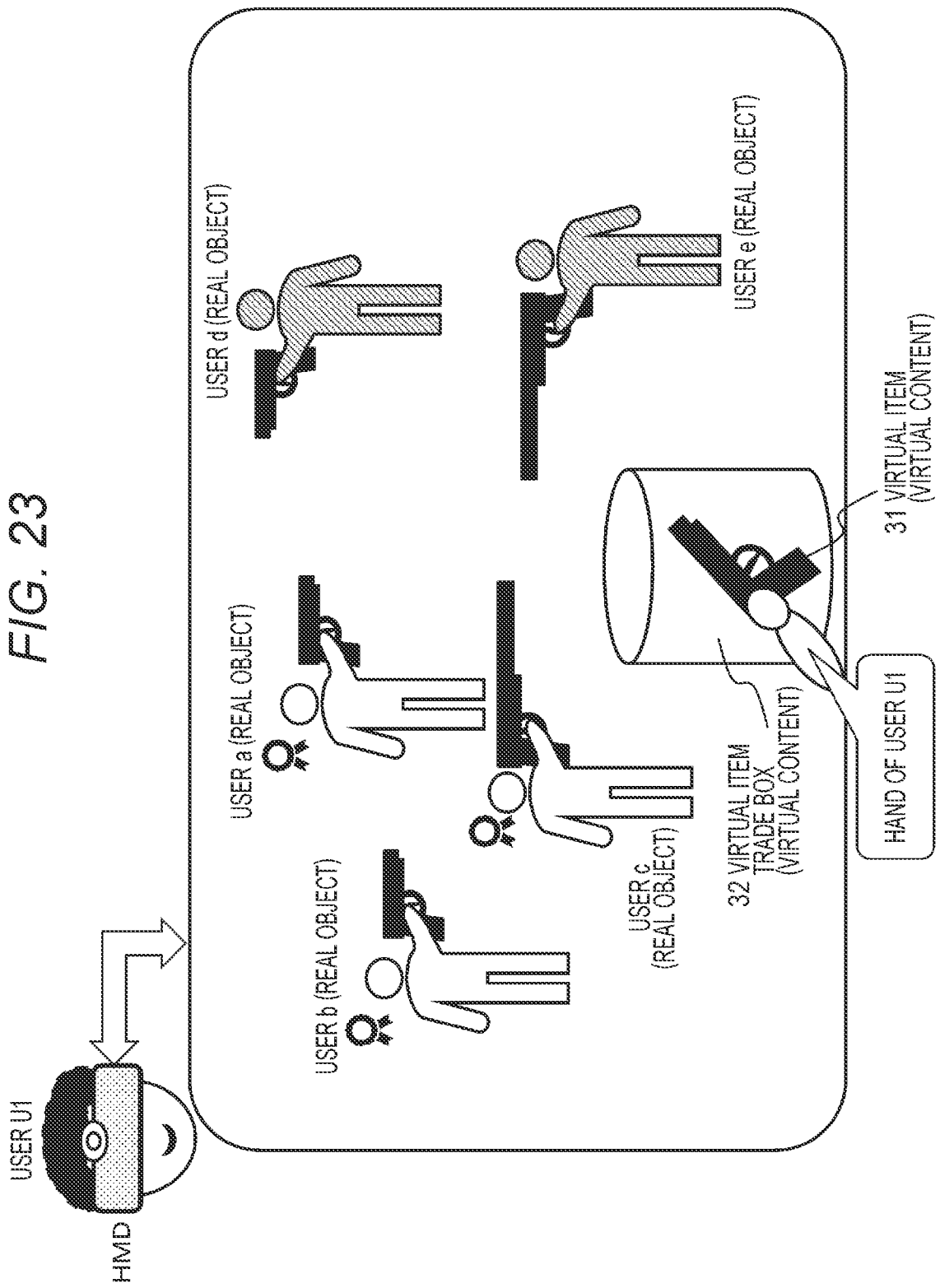
FIG. 23 is a diagram explaining a specific example of processing executed by the information processing apparatus of the present disclosure.

FIG. 23 is a diagram illustrating an example of specific processing of the virtual item ownership transfer processing executed by the information supplement processing apparatus of the present disclosure.

The display image of the HMD worn by a user U1 is illustrated.

The display image example illustrated in FIG. 23 is an example of AR image display in game content. This is a game in which a plurality of users is divided into a friendly team and an enemy team, which fight each other Each user owns a weapon such as a pistol and a rifle, which are virtual content, and fights against the opponent team.

The team members of the user U1 are users a to c, and users d and e are members of the enemy team.

The authentication identification mark is displayed for the users a to c.

The virtual item to be traded here is a pistol. The pistol, which is the virtual item 31 to be traded, is displayed in the virtual item trade box 32 in the state of being held in the hand of the user U1.

In this state, for example, when one of the users a to c for which the authentication identification mark is displayed puts the hand in the virtual item trade box 32, the processing according to the sequence described above with reference to FIGS. 19 to 22 is executed, and the trade processing of the virtual item (pistol), that is, the ownership transfer processing is executed.

In a case where such processing is performed, an individual virtual item trade box corresponding to each of the users a to c may be configured to be displayed, and individual trade processing may be performed in the individual trade box.

Note that when any of the users d to e for which the authentication identification mark is not displayed puts the hand in the virtual item trade box 32, the trade processing of the virtual item (pistol), that is, the ownership transfer processing is not executed.

In this case, in the determination processing of step S103 of the flow illustrated in FIG. 19 described above, that is, the determination processing as to whether or not the detected user has been authenticated, specifically, the determination processing as to whether or not the detected user is registered in the credit user list of the user U1, No is determined. As a result, the trade processing of the virtual item (pistol), that is, the ownership transfer processing is not executed.

Figure 24:
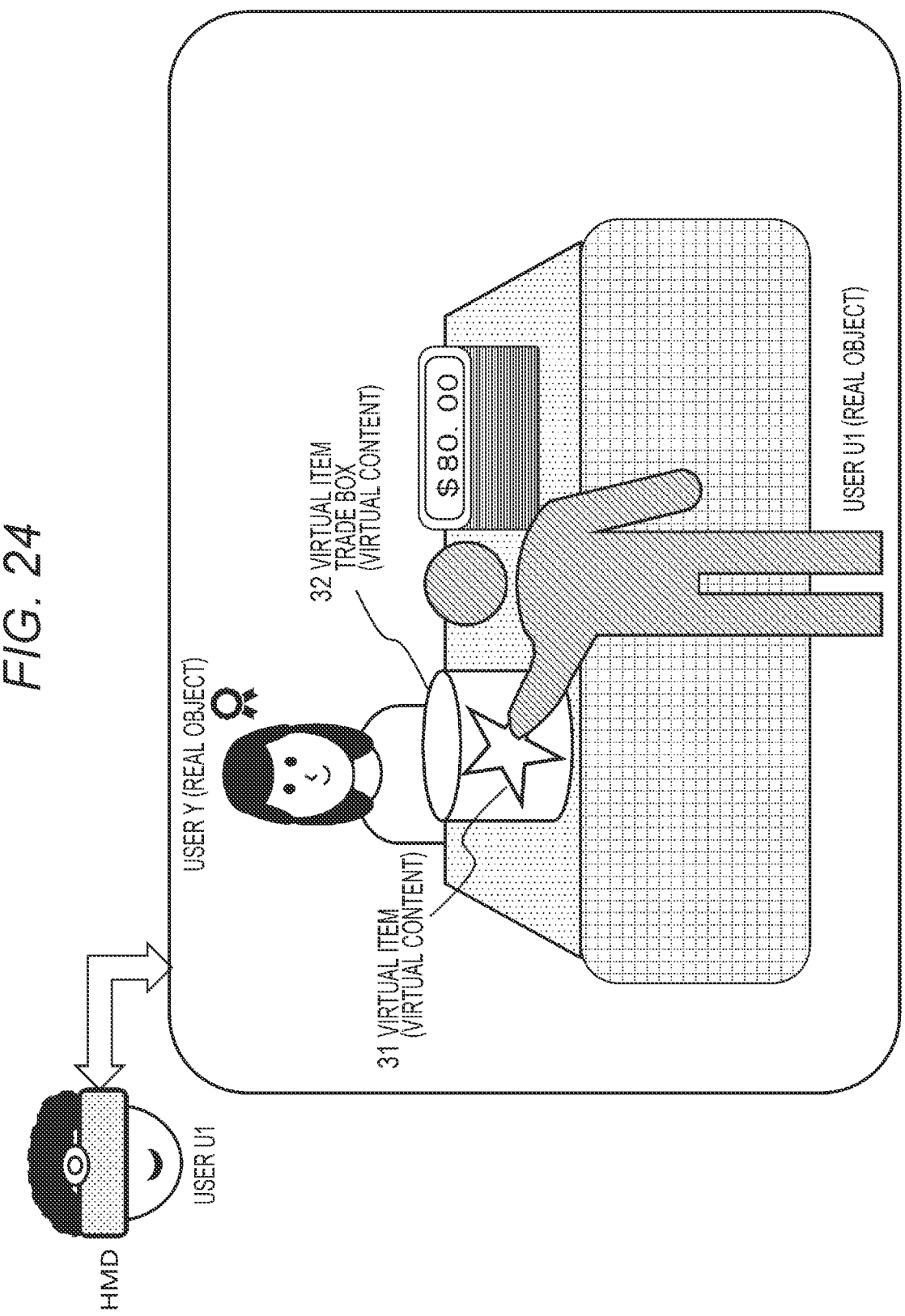
FIG. 24 is a diagram explaining a specific example of processing executed by the information processing apparatus of the present disclosure.

FIG. 24 is a diagram illustrating another example of specific processing of the virtual item ownership transfer processing executed by the information supplement processing apparatus of the present disclosure.

The display image of the HMD worn by a user U1 is illustrated.

The display image example illustrated in FIG. 24 is, for example, an example of AR image display in product trade processing in a virtual store. This is as example in which the user U1 sells virtual content at a virtual store.

The user U1 stands in front of a clerk of the virtual store, holds a virtual item "star" in the hand, and puts the hand in the virtual item trade box 32 displayed in front of the clerk.

The virtual item to be traded here is a "star". The star, which is the virtual item 31 to be traded, is displayed in the virtual item trade box 32 in the state of being held in the hand of the user U1.

In this state, for example, when the clerk for which the authentication identification mark is displayed puts the hand in the virtual item trade box 32, the processing according to the sequence described above with reference to FIGS. 19 to 22 is executed, and the trade processing of the virtual item (star), that is, the ownership transfer processing is executed.

For example, when a price of $80 per star is set in advance, by this trade processing, the processing that the ownership of the virtual item (star) is transferred to the store side and instead the user U1 acquires the ownership of $80 is also possible.

Note that in the case of an entity such as a clerk of a virtual store, the system management side can set it as an officially authenticated entity in advance. The official entity authenticated by the management side in this way may be set to be automatically given credit.

Normally, a trade cannot be made with a person who is not on the credit list, but the clerk who appears here is a character officially certified by the management side, so that even when it is not listed in advance on the credit list, the authentication identification mark is displayed.

Note that, in the example described above, the example in which the virtual item providing user and the virtual item receiving user are all real humans is described, but the virtual item providing user and the virtual item receiving user may be, for example, animals or robots other than humans, or virtual content.

Specifically, a configuration in which virtual content such as a meal or toy given to a real dog and a dog, which is virtual content, and a weapon given to a robot is provided or the like is possible.

For example, when a horse, which is virtual content, is set as a virtual item receiving user and the user holds a carrot, which is a virtual item, in the hand and brings it close to the horse's mouth, the virtual item trade box is displayed at the horse's mouth.

Here, the image display control in which when the user puts the hand in the virtual item trade box and opens the hand, the carrot is taken into the horse's body and disappears is also possible.

Furthermore, a real vending machine is set as a virtual item receiving user, and when the user holds a coin, which is a virtual item, and approaches the vending machine, the virtual item trade box is displayed.

Here, the image display control in which when the user puts the hand in the virtual item trade box and opens the hand, the coin is taken into the vending machine and disappears and a product comes out is also possible.

Note that the horse and the vending machine described above can also be set to be an officially authenticated entity in advance by the system management side. When the horse to be fed or vending machine is set to have an ID (and name) by the management side, the name is displayed and the authentication identification mark is displayed even when it is not on the credit list.

Furthermore, the example described above is described as an example of one-to-one trade processing in which the virtual item providing user and the virtual item receiving user are both one user, but, for example, the virtual item receiving user may be a plurality of users.

For example, it is a configuration in which user A owns two virtual items, specifically, for example, two "stars", which are provided to two users B and C, respectively.

However, is a case where such processing is performed, it is preferable that an individual virtual item trade box corresponding to each user is configured to be displayed and individual trade processing is performed in the individual trade box.

Furthermore, as a configuration to display a virtual trade box a recycle bin, a configuration that performs ownership relinquish processing in which the virtual item providing user holds the virtual item, puts the hand in the virtual trade box in the recycle bin and opens the hand so that the virtual item is thrown into the recycle bin is also possible.

7. Regarding Hardware Configuration Example of the Information Processing Apparatus Next, a hardware configuration example of the information processing apparatus that executes the processing according to the example described above will be described with reference to FIG. 25.

Figure 25:
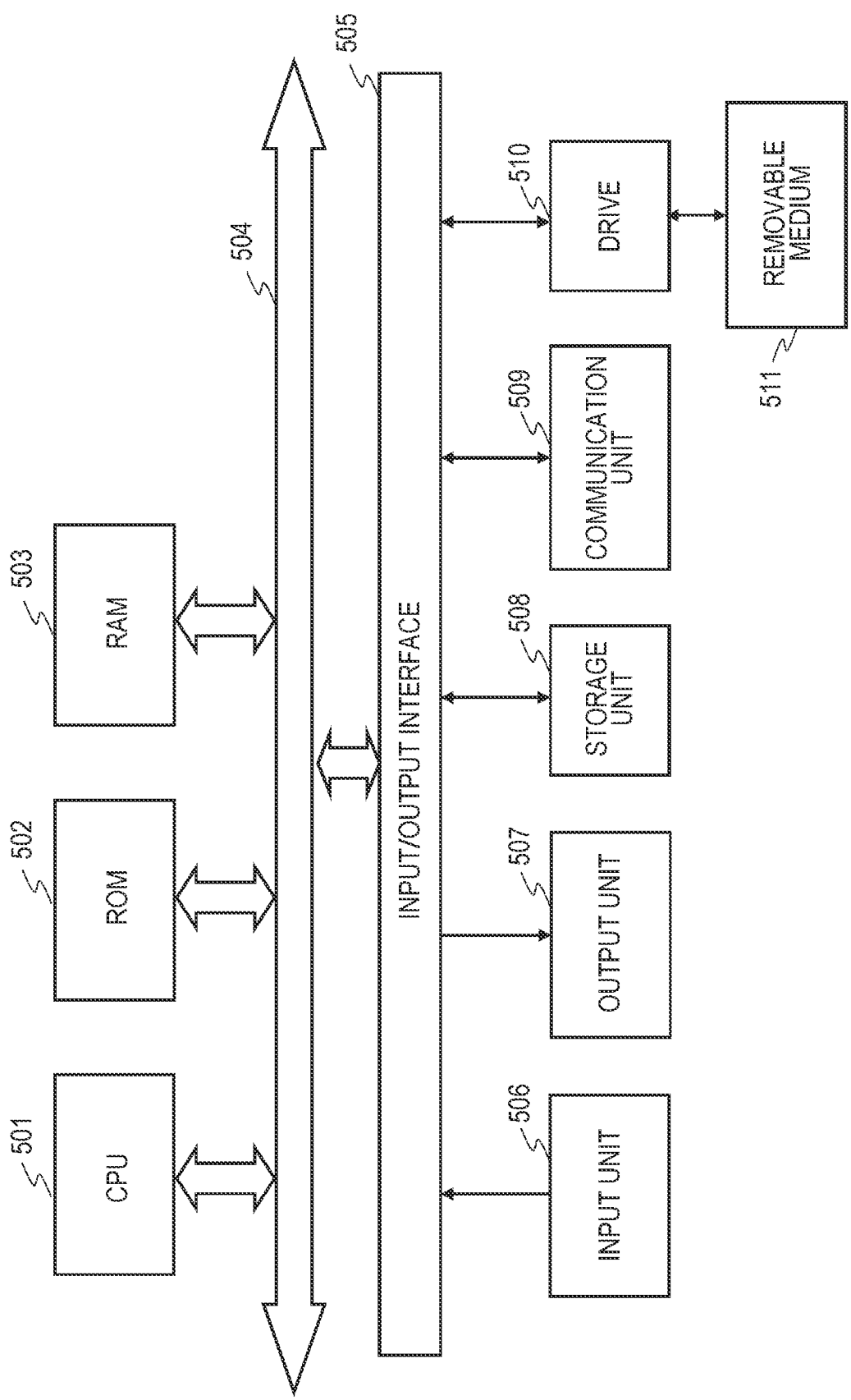
FIG. 25 is a diagram explaining a hardware configuration example of the information processing apparatus of the present disclosure.

The hardware illustrated in FIG. 25 is an example of the hardware configuration of the information processing apparatus of the present disclosure, for example, an information processing apparatus such as an HMD, a PC, a smartphone, or a server.

The hardware configuration illustrated in FIG. 25 will be described.

A central processing unit (CPU) 501 functions as a data processing unit that executes various processing according to a program stored in a read only memory (ROM) 502 or a storage unit 508. For example, the processing according to the sequence described in the example described above is executed. A random access memory (RAM) 503 stores a program and data executed by the CPU 501. The CPU 501, the ROM 502, and the RAM 503 are connected to each other via a bus 504.

The CPU 501 is connected to an input/output interface 505 via the bus 504, and the input/output interface 505 is connected to an input unit 506 including various sensors, a camera, a switch, a keyboard, a mouse, a microphone, or the like, and an output unit 507 including a display, a speaker, or the like.

The storage unit 508 connected to the input/output interface 505 includes, for example, a hard disk or the like, and stores a program executed by the CPU 501 and various data. A communication unit 509 functions as a transmission/reception unit for data communication via a network such as the Internet or a local area network, and communicates with an external apparatus.

A drive 510 connected to the input/output interface 505 drives a removable medium 511 such as a magnetic disk, an optical disk, a magneto-optical disk, or a semiconductor memory such as a memory card, and executes recording or reading of data.

8. Summary of Configuration of the Present Disclosure

As described above, the examples of the present disclosure have been described in detail with reference to the specific examples. However, it is obvious that those skilled in the art can modify or substitute the examples without departing from the gist of the present disclosure. That is, the present invention has been disclosed in the form of an example and should not be construed in a limited manner. In order to determine the gist or the present disclosure, the column of the claims should be considered.

Note that the technology disclosed in the present specification may have the following configurations.

(1) An information processing apparatus including:
  a data processing unit that executes display control of an augmented reality (AR) image in which a real object and virtual content are superimposed and displayed, in which
  the date processing unit
  executes display control of a virtual item that is virtual content for which an ownership is registered, and a virtual item trade box that is a limited region for performing ownership transfer processing of the virtual item, and
  performs processing of transferring the ownership of the virtual item in a case where processing of delivery of the virtual item is executed in the virtual item trade box.

(2) The information Processing Apparatus According to (1), in Which
  the data processing unit performs processing of transferring the ownership of the virtual item in a case where the processing of delivery of the virtual item is executed in a state where hands of both a virtual item providing user who has the ownership of the virtual item and a virtual item receiving user who is to acquire the ownership of the virtual item are inside the virtual item trade box.

(3) The Information Processing Apparatus According to (1) or (2), in which the data processing unit performs processing of transferring the ownership of the virtual item in a case where a virtual item receiving user who is to acquire the ownership of the virtual item is a user for which an authentication identification mark indicating that virtual item receiving user is a user that a virtual item providing user gives credit is displayed.

(4) The information processing apparatus according to any of to (3), in which the data processing unit executes virtual item display position control in which in a state where hands of both a virtual item providing user who holds the virtual item in the hand and a virtual item receiving user who is to acquire the ownership of the virtual item are inside the virtual item trade box, in a case where the virtual item providing user opens the hand, a display position of the virtual item is moved to a hand side of the virtual item receiving user.

(5) The Information Processing Apparatus According to (4), in Which the data processing unit executes virtual item display position control in which in a case where after the display position of the virtual item is moved to the hand side of the virtual item receiving user, the hand of the virtual item receiving user is closed while holding the virtual item, thereafter, a virtual item display position is displayed following the hand of the virtual item receiving user.

(6) The Information Processing Apparatus According to any of (1) to (5), in Which the data processing unit displays the virtual item trade box in a case where a predetermined condition is satisfied.

(7) The information processing apparatus according to any of (1) to (6), in which the data processing unit displays the virtual item trade box in a case where a distance between a virtual item providing user who has the ownership of the virtual item and a virtual item receiving user who is to acquire the ownership of the virtual item is equal to or less than a specified distance.

(8) The information processing apparatus according to any of (1) to (7), in which the data processing unit displays the virtual item trade box in a case where a virtual item receiving user who is to acquire the ownership of the virtual item is displayed within a specified region of a display screen of the AR image.

(9) The information processing apparatus according to any of (1) to (8), in which the data processing unit hides the virtual item trade box is a case where a predetermined condition is satisfied.

(10) The information processing apparatus according to any of (1) to (9), in which the data processing unit hides the virtual item trade box in a case where a distance between a virtual item providing user who has the ownership of the virtual item and a virtual item receiving user who is to acquire the ownership of the virtual item is equal to or more than a specified distance.

(11) The information processing apparatus according to any of (1) to (10), in which the data processing unit executes user identification processing of a virtual item receiving user who is to acquire the ownership of the virtual item and displays a user name acquired on the basis of an identification result near the virtual item receiving user.

(12) The information processing apparatus according to any of (1) to (11), in which the data processing unit executes credibility determination processing as to whether or not a virtual item receiving user who is to acquire the ownership of the virtual item is a user that a virtual item providing user gives credit, and in a case where it is determined that the virtual item receiving user is a credit user, displays an authentication identification mark near the virtual item receiving user.

(13) The information processing apparatus according to (12), in which the data processing unit executes the credibility determination processing with reference to an inter-user credit information list stored in a storage unit.

(14) The information processing apparatus according to any of (1) to (13), in which the data processing unit executes processing of updating registration data of a user-owned item list that is a list stored in a storage unit and in which a virtual item owned by each user is registered in a case where the processing of delivery of the virtual item is executed in the virtual item trade box.

(15) An information processing system including:

a user terminal that has a display unit that displays an augmented reality (AR) image in which a real object and virtual content are superimposed and displayed; and a server that executes communication with the user terminal and executes display control of the AR image displayed on the display unit of the user terminal, in which as virtual content display control processing with respect to the display unit of the user terminal, the server executes display control of a virtual item that is virtual content for which an ownership is registered, and a virtual item trade box that is a limited region for performing ownership transfer processing of the virtual item, and performs processing of transferring the ownership of the virtual item in a case where processing of delivery of the virtual item is executed in the virtual item trade box.

(16) The information processing system according to (15), in which the server performs processing of transferring the ownership of the virtual item in a case where the processing of delivery of the virtual item is executed in a state where hands of both a virtual item providing user who has the ownership of the virtual item and a virtual item receiving user who is to acquire the ownership of the virtual item are inside the virtual item trade box in the AR image displayed on the display unit of the user terminal.

(17) The information processing system according to (15) or (16), in which the server executes virtual item display position control in which in a state where hands of both a virtual item providing user who holds the virtual item in the hand and a virtual item receiving user who is to acquire the ownership of the virtual item are inside the virtual item trade box, in a case where the virtual item providing user opens the hand, a display position of the virtual item is moved to a hand side of the virtual item receiving user, and moreover, in a case where the hand of the virtual item receiving user is closed while holding the virtual item, thereafter, a virtual item display control is displayed following the hand of the virtual item receiving user in the AR image displayed on the display unit of the user terminal.

(18) An information processing method executed in an information processing apparatus including:
a data processing unit that executes display control of an augmented reality (AR) image in which a real object and virtual content are superimposed and displayed,
information processing method including:
by the data processing unit,
executing display control of a virtual item that is virtual content for which an ownership is registered, and a virtual item trade box that is a limited region for performing ownership transfer processing of the virtual item; and
performing processing of transferring the ownership of the virtual item in a case where processing of delivery of the virtual item is executed in the virtual item trade box.

(19) An information processing method executed in an information processing system including:
a user terminal that has a display unit that displays an augmented reality (AR) image in which a real object and virtual content are superimposed and displayed; and
a server that executes communication with the user terminal and executes display control of the AR image displayed on the display unit of the user terminal,
the information processing method including:
by the server,
as virtual content display control processing with respect to the display unit of the user terminal,
executing display control of a virtual item that is virtual content for which an ownership is registered, and a virtual item trade box that is a limited region for performing ownership transfer processing of the virtual item; and
performing processing of transferring the ownership of the virtual item in a case where processing of delivery of the virtual item is executed in the virtual item trade box.

(20) A program causing an information processing apparatus to execute information processing, the information processing apparatus including:
a data processing unit that executes display control of an augmented reality (AR) image in which a real object and virtual content are superimposed and displayed,
the program causing the data processing unit to:
execute display control of a virtual item that is virtual content for which an ownership is registered, and a virtual item trade box that is a limited region for performing ownership transfer processing of the virtual item; and
perform processing of transferring the ownership of the virtual item in a case where processing of delivery of the virtual item is executed in the virtual item trade box.

The series of processing described in the specification can be executed by hardware, software, or a composite configuration of both. In a case where the processing is executed by software, a program that records the processing sequence can be installed and executed in the memory in a computer built in dedicated hardware, or a program can be installed and executed on a general-purpose computer that can execute various processing. For example, the program can be pre-recorded on a recording medium. In addition to installing on a computer from a recording medium, a program can be received via a network such as local area network (LAN) and the Internet and installed on a recording medium such as a built-in hard disk.

Note that the various processing described in the specification is not only executed in chronological order according to the description, but may also be executed in parallel or individually according to the processing capacity of an apparatus that executes the processing or where necessary. Furthermore, in the present specification, the system is a logical set configuration of a plurality of apparatuses, and is not limited to those in which the apparatuses of each configuration are in the same housing.

INDUSTRIAL APPLICABILITY

As described above, with the configuration of one example of the present disclosure, an apparatus and a method that unfailingly perform the virtual item ownership transfer processing are realized.

Specifically, for example, a data processing unit that executes display control of an AR image in which a real object and virtual content are superimposed and displayed is provided. The data processing unit executes display control of a virtual item whose ownership is registered and a virtual item trade box for transferring the ownership of the virtual item, and moreover, in a case where delivery of the virtual item is executed in the virtual item trade box, transfers the ownership of the virtual item. When the virtual item providing user opens the hand in a state where the user's hand is in the virtual item trade box, the virtual item is moved to the hand side of the virtual item receiving user, and the ownership transfer registration processing or the like is performed.

With this configuration, as apparatus and a method that unfailingly perform the virtual item ownership transfer processing are realized.

REFERENCE SIGNS LIST

10 Virtual item providing user
11 Transmissive HMD
12 Camera
13 PC
14 Smartphone
15 Non-transmissive HMD
20 Virtual item receiving user
21 Real object image
31 Virtual item.
32 Virtual item trade box
35 Alternative virtual item
100 Information processing apparatus
110 Storage unit
111 User list
112 User-owned item list
113 Inter-user credit information list
115 Communication unit
121 User information acquisition unit
122 User-owned item information acquisition unit
123 User credit information acquisition unit
124 User identification & user motion detection unit.
131 Virtual content display control unit
132 Virtual item trade box display control unit
133 Virtual item trade control unit
134 User-owned item information update unit 151 Sensor
152 Display unit
301 Regulation region
501 CPU
502 ROM
503 RAM
504 Bus
505 Input/output interface
506 Input unit.
507 Output unit
508 Storage unit
509 Communication unit
510 Drive
511 Removable medium

The invention claimed is:

1. An information processing apparatus comprising:
   circuitry configured to
   execute display control of an augmented reality (AR) image in which a real object and virtual content are superimposed and displayed,
   execute display control of
   a virtual item that is virtual content for which an ownership is registered, and
   a virtual item trade box that is a limited region for performing ownership transfer processing of the virtual item, and
   perform processing of transferring the ownership of the virtual item in a case where processing of delivery of the virtual item is executed in the virtual item trade box,
   wherein the circuitry executes the display control of the virtual item trade box according to whether one or more predetermined conditions are satisfied.

2. The information processing apparatus according to claim 1,
   wherein the circuitry performs the processing of transferring the ownership of the virtual item in a case where the processing of delivery of the virtual item is executed in a state where hands of both a virtual item providing user who has the ownership of the virtual item and a virtual item receiving user who is to acquire the ownership of the virtual item are inside the virtual item trade box.

3. The information processing apparatus according to claim 1,
   wherein the circuitry performs the processing of transferring the ownership of the virtual item in a case where a virtual item receiving user who is to acquire the ownership of the virtual item is a user for which an authentication identification mark indicating that virtual item receiving user is a user that a virtual item providing user gives credit is displayed.

4. The information processing apparatus according to claim 1,
   wherein the circuitry is further configured to execute virtual item display position control in which in a state where hands of both a virtual item providing user who holds the virtual item in the hand and a virtual item receiving user who is to acquire the ownership of the virtual item are inside the virtual item trade box, in a case where the virtual item providing user opens the hand, a display position of the virtual item is moved to a hand side of the virtual item receiving user.

5. The information processing apparatus according to claim 4,
   wherein the circuitry is further configured to execute virtual item display position control in which in a case where after the display position of the virtual item is moved to the hand side of the virtual item receiving user, the hand of the virtual item receiving user is closed while holding the virtual item, thereafter, a virtual item display position is displayed following the hand of the virtual item receiving user.

6. The information processing apparatus according to claim 1,
   wherein the circuitry executes the display control to display the virtual item trade box in a case where a first predetermined condition is satisfied.

7. The information processing apparatus according to claim 1,
   wherein the circuitry executes the display control to display the virtual item trade box in a case where a distance between a virtual item providing user who has the ownership of the virtual item and a virtual item receiving user who is to acquire the ownership of the virtual item is equal to or less than a specified distance.

8. The information processing apparatus according to claim 1,
   wherein the circuitry executes the display control to display the virtual item trade box in a case where a virtual item receiving user who is to acquire the ownership of the virtual item is displayed within a specified region of a display screen of the AR image.

9. The information processing apparatus according to claim 1,
   wherein the circuitry executes the display control to hide the virtual item trade box in a case where a second predetermined condition is satisfied.

10. The information processing apparatus according to claim 1,
    wherein the circuitry executes the display control to hide the virtual item trade box in a case where a distance between a virtual item providing user who has the ownership of the virtual item and a virtual item receiving user who is to acquire the ownership of the virtual item is equal to or more than a specified distance.

11. The information processing apparatus according to claim 1,
    wherein the circuitry is further configured to
    execute user identification processing of a virtual item receiving user who is to acquire the ownership of the virtual item, and
    display a user name acquired based on an identification result near the virtual item receiving user.

12. The information processing apparatus according to claim 1,
    wherein the circuitry is further configured to
    execute credibility determination processing as to whether or not a virtual item receiving user who is to acquire the ownership of the virtual item is a user that a virtual item providing user gives credit, and
    control display, in a case where it is determined that the virtual item receiving user is a credit user, of an authentication identification mark near the virtual item receiving user.

13. The information processing apparatus according to claim 12,
    wherein the circuitry executes the credibility determination processing with reference to an inter-user credit information list stored in a non-transitory computer-readable storage medium.

14. The information processing apparatus according to claim 1, wherein the circuitry is further configured to execute processing of updating registration data of a user-owned item list that is a list stored in a storage unit and in which a virtual item owned by each user is registered in a case where the processing of delivery of the virtual item is executed in the virtual item trade box.

15. An information processing system comprising:
a user terminal including a display unit configured to display an augmented reality (AR) image in which a real object and virtual content are superimposed and displayed; and
a server configured to
execute communication with the user terminal,
execute display control of the AR image displayed on the display unit of the user terminal,
execute, as virtual content display control processing with respect to the display unit of the user terminal, display control of
a virtual item that is virtual content for which an ownership is registered, and
a virtual item trade box that is a limited region for performing ownership transfer processing of the virtual item, and
perform processing of transferring the ownership of the virtual item in a case where processing of delivery of the virtual item is executed in the virtual item trade box,
wherein the server executes the display control of the virtual item trade box according to whether one or more predetermined conditions are satisfied.

16. The information processing system according to claim 15,
wherein the server performs the processing of transferring the ownership of the virtual item in a case where the processing of delivery of the virtual item is executed in a state where hands of both a virtual item providing user who has the ownership of the virtual item and a virtual item receiving user who is to acquire the ownership of the virtual item are inside the virtual item trade box in the AR image displayed on the display unit of the user terminal.

17. The information processing system according to claim 15,
wherein the server is further configured to execute virtual item display position control in which in a state where hands of both a virtual item providing user who holds the virtual item in the hand and a virtual item receiving user who is to acquire the ownership of the virtual item are inside the virtual item trade box, in a case where the virtual item providing user opens the hand, a display position of the virtual item is moved to a hand side of the virtual item receiving user, and moreover, in a case where the hand of the virtual item receiving user is closed while holding the virtual item, thereafter, a virtual item display position is displayed following the hand of the virtual item receiving user in the AR image displayed on the display unit of the user terminal.

18. An information processing method executed in an information processing apparatus including circuitry configured to execute display control of an augmented reality (AR) image in which a real object and virtual content are superimposed and displayed, the information processing method comprising:
executing display control of
a virtual item that is virtual content for which an ownership is registered, and
a virtual item trade box that is a limited region for performing ownership transfer processing of the virtual item; and
performing processing of transferring the ownership of the virtual item in a case where processing of delivery of the virtual item is executed in the virtual item trade box,
wherein the display control of the virtual item trade box is executed according to whether one or more predetermined conditions are satisfied.

19. An information processing method executed in an information processing system including a user terminal that has a display unit configured to display an augmented reality (AR) image in which a real object and virtual content are superimposed and displayed, and a server configured to execute communication with the user terminal and execute display control of the AR image displayed on the display unit of the user terminal, the information processing method comprising:
executing, by the server, as virtual content display control processing with respect to the display unit of the user terminal, display control of
a virtual item that is virtual content for which an ownership is registered, and
a virtual item trade box that is a limited region for performing ownership transfer processing of the virtual item; and
performing processing of transferring the ownership of the virtual item in a case where processing of delivery of the virtual item is executed in the virtual item trade box,
wherein the server executes the display control of the virtual item trade box according to whether one or more predetermined conditions are satisfied.

20. A non-transitory computer-readable storage medium having embodied thereon a program, which when executed by an information processing apparatus of a computer causes the information processing apparatus to execute an information processing method for executing display control of an augmented reality (AR) image in which a real object and virtual content are superimposed and displayed, the information processing method comprising:
executing display control of
a virtual item that is virtual content for which an ownership is registered, and
a virtual item trade box that is a limited region for performing ownership transfer processing of the virtual item; and
performing processing of transferring the ownership of the virtual item in a case where processing of delivery of the virtual item is executed in the virtual item trade box,
wherein the display control of the virtual item trade box is executed according to whether one or more predetermined conditions are satisfied.

* * * * *